United States Patent
Lee

(10) Patent No.: US 11,985,157 B2
(45) Date of Patent: May 14, 2024

(54) INTERACTIVE INTERFACES AND DATA STRUCTURES REPRESENTING PHYSICAL AND/OR VISUAL INFORMATION USING SMART PINS

(71) Applicant: The Aerospace Corporation, El Segundo, CA (US)

(72) Inventor: Richard M. Lee, El Segundo, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 1148 days.

(21) Appl. No.: 16/751,261

(22) Filed: Jan. 24, 2020

(65) Prior Publication Data
US 2021/0234882 A1 Jul. 29, 2021

(51) Int. Cl.
| | | |
|---|---|---|
| H04L 9/40 | (2022.01) | |
| G06F 21/57 | (2013.01) | |
| G06N 20/00 | (2019.01) | |
| G06T 15/00 | (2011.01) | |

(52) U.S. Cl.
CPC ........ *H04L 63/1433* (2013.01); *G06F 21/577* (2013.01); *G06N 20/00* (2019.01); *G06T 15/005* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 10,902,114 B1* | 1/2021 | Trost | G06F 16/26 |
| 11,170,334 B1* | 11/2021 | Orzechowski | G06N 20/00 |
| 11,201,893 B2* | 12/2021 | Kruse | G06F 21/552 |
| 11,683,333 B1* | 6/2023 | Dominessy | H04L 43/045 |
| | | | 726/25 |
| 11,757,907 B1* | 9/2023 | Berger | H04L 63/1425 |
| | | | 726/23 |
| 2015/0116465 A1* | 4/2015 | Wang | H04N 13/30 |
| | | | 348/51 |
| 2016/0205137 A1* | 7/2016 | Babb | H04L 63/20 |
| | | | 726/1 |
| 2018/0041523 A1* | 2/2018 | Lim | G06F 21/50 |
| 2018/0059876 A1* | 3/2018 | Peng | G06F 16/26 |
| 2018/0159876 A1* | 6/2018 | Park | H04L 63/1425 |
| 2020/0067985 A1* | 2/2020 | Bhargava | G06F 3/0481 |
| 2020/0234154 A1* | 7/2020 | Ares | G06F 16/217 |
| 2020/0296138 A1* | 9/2020 | Crabtree | H04L 63/1425 |
| 2021/0021636 A1* | 1/2021 | Sbandi | H04L 63/1466 |
| 2021/0112090 A1* | 4/2021 | Rivera | H04L 63/1441 |

* cited by examiner

*Primary Examiner* — Christopher C Harris
(74) *Attorney, Agent, or Firm* — LeonardPatel PC

(57) ABSTRACT

Interactive interfaces and data structures representing physical and/or visual information are provided using smart pins (also called "pins" herein). Pins representing vectors of information may be provided. For instance, in the context of cybersecurity, each pin may represent an attack vector that an adversary can use to attack a system. Each pin may have a depth meter and may move up or down according to its value in an operating range. Each pin may also have a color, a number, or both, representing its current value in the operating range. Such pins may provide both a three-dimensional representation of data that is intuitive to users.

41 Claims, 16 Drawing Sheets

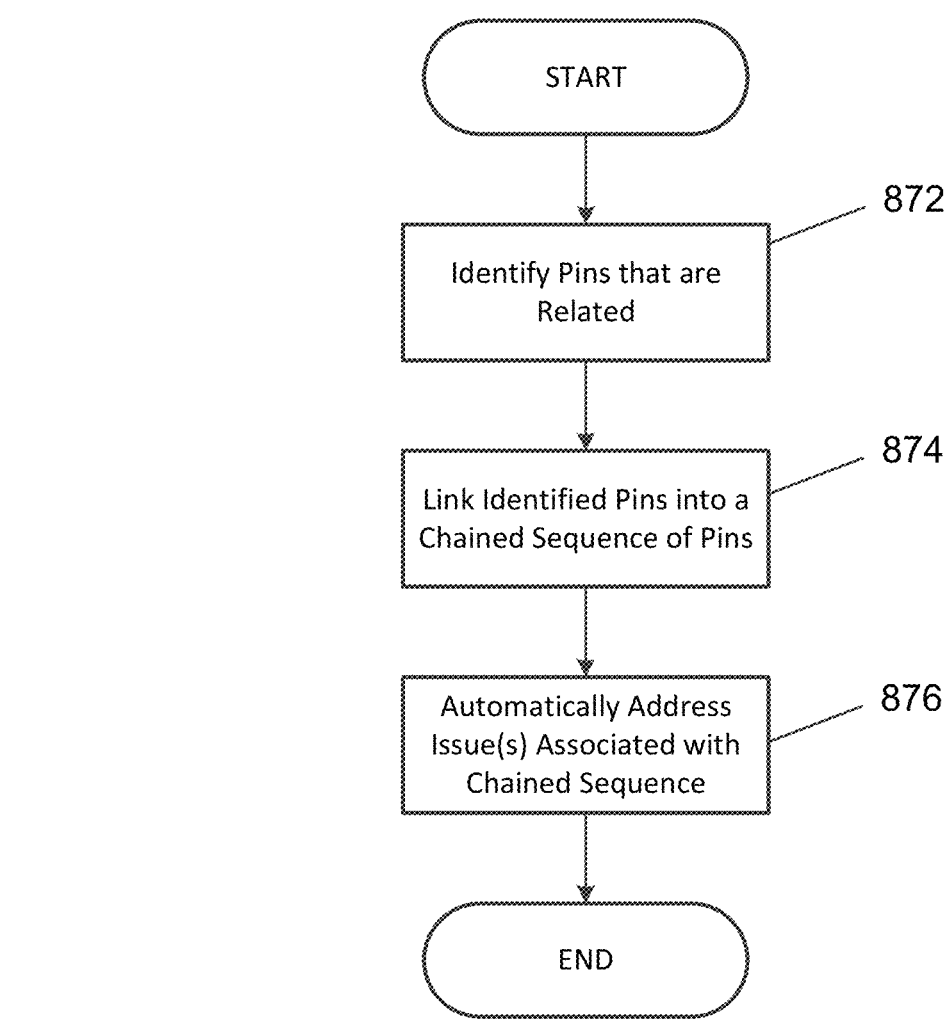

INTERACTIVE INTERFACES AND DATA STRUCTURES REPRESENTING PHYSICAL AND/OR VISUAL INFORMATION USING SMART PINS

STATEMENT OF GOVERNMENT INTEREST

This invention was made with government support under Contract No. FA8802-19-C-0001 awarded by the Department of the Air Force. The government has certain rights in the invention.

FIELD

The present invention generally pertains to interactive interfaces and data structures representing physical and/or visual information using smart pins.

BACKGROUND

Conventional visualization technologies compress large amounts of data into statistics typically shown as percentages or graphs. Users must typically find more detailed information themselves by navigating to a different layer of data granularity by clicking a specific data element on a web page or an application to drill down to the desired level of detail. However, such visualization technologies lose the bigger picture as the user drills down. In other words, the user "can't see the forest through the trees." Also, trying to navigate too much data can lead to visual fatigue and frustration.

Development of visualization technologies for cybersecurity, for example, is often left to subjective interpretation and gut instinct, rather than being quantitative. Often, the evaluation process is not captured, is non-repeatable, and is insufficient for the desired purpose, leading to error-prone conclusions and a false sense of security. For example, the OWASP Cyber Defense Matrix is a typical technique used to map out a defense posture. See graph 100 of FIG. 1. It is typically implemented with a spreadsheet using Microsoft Excel®. The CyberARM Cyber Defense Matrix (see graph 200 of FIG. 2) for allegedly resilient cost-effective cybersecurity planning extends the OWASP Cyber Defense Matrix along the cyber kill chain. However, the CyberARM Cyber Defense Matrix is also typically captured in a spreadsheet. Results are displayed in the form of percentages, an intuitive interface to allow near real-time updates and interaction is neither provided nor supported. Such implementations may lead to eye fatigue and manual discrete updates do not keep up with the demands required to support near real-time cyber awareness during cyber warfare. Accordingly, an improved visualization approach may be beneficial.

SUMMARY

Certain embodiments of the present invention may provide solutions to the problems and needs in the art that have not yet been fully identified, appreciated, or solved by conventional visualization technologies and data structures. For example, some embodiments of the present invention pertain to interactive interfaces and data structures representing physical and/or visual information using smart pins.

In an embodiment, a computer-implemented method includes generating a plurality of pins, by a computing system. The plurality of pins represent vectors of information and include an operating range and a value. The computer-implemented method also includes generating 3-D representations of the plurality of pins, by the computing system, and displaying the 3-D representations of the plurality of pins on a display, by the computing system.

In another embodiment, a computer program is embodied on a non-transitory computer-readable medium. The program is configured to cause at least one processor to generate a plurality of pins representing vectors of information and including an operating range and a value. The operating range is defined by a statistical distribution. The program is also configured to cause the at least one processor to generate 3-D representations of the plurality of pins within cells of a matrix.

In yet another embodiment, a computing system includes memory storing computer program instructions and at least one processor configured to execute the computer program instructions. The instructions are configured to cause the at least one processor to generate a plurality of pins representing vectors of information and including an operating range and a value. The operating range is defined by one or more statistical distributions. The instructions are also configured to cause the at least one processor to generate 3-D representations of the plurality of pins within cells of a matrix. Each pin represents an attack vector, a countermeasure, or both, for a cybersecurity visualization framework. The 3-D representation of the plurality of pins and the matrix display both attacks and defenses simultaneously.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8B is a flowchart illustrating a process for linking pins, according to an embodiment of the present invention.

DETAILED DESCRIPTION OF THE EMBODIMENTS

Some embodiments of the present invention pertain to interactive interfaces and data structures representing physical and/or visual information using smart pins (also called "pins" herein). In some embodiments, "pins" representing vectors of information may be used. For instance, in the context of cybersecurity, each pin may represent an attack vector that an adversary can use to attack a system. An attack vector, as used herein, is a path or means by which an adversary can gain access to an information technology (IT) or operational technology (OT) device in order to deliver a payload or malicious outcome (e.g., the Mitre ATT&CK® framework, Common Vulnerabilities and Exposures (CVE®), Common Weakness Enumeration (CWE), National Vulnerability Database (NVD), Common Vulnerability Scoring System (CVSS), etc.). A payload or malicious outcome may include malware, or otherwise "good" programs used for malicious purposes. For example, a virus scanner could be compromised and pointed to an encrypted drive, which will identify virus signatures on a randomized set of encrypted bits, thus creating false positives. False positives occur when a scanner, a Web Application Firewall (WAF), an Intrusion Prevention System (IPS), etc., flags safe code as a security vulnerability. False negatives may also be provided. A false negative is the opposite of a false positive, indicating that no vulnerability exists when in fact it does. Safe and potentially valuable content may thus be improperly deleted.

An attack vector is an entry point to initially compromise a system. A conventional and popular framework to identify and manage attack vectors is the MITRE ATT&CK framework, which is a globally accessible knowledgebase of adversary tactics and techniques based on real world observations. Each cell in the MITRE ATT&CK matrix represents an area where attack vectors may be deployed. It should be noted that the ATT&CK matrix may be updated and evolve over time.

In some embodiments, pins can serve as a filtering mechanism when provided with metadata. Metadata is essentially a set of data that provides information about one or more aspects of other data. For instance, in the context of HyperText Markup Language (HTML), metadata defined in the <head> element may provide the document title, character set, styles, scripts, and other meta information for a webpage. Pins may be provided with metadata regarding a dataset and may use this metadata to filter the dataset to provide more useful information to the user.

Figure 4:
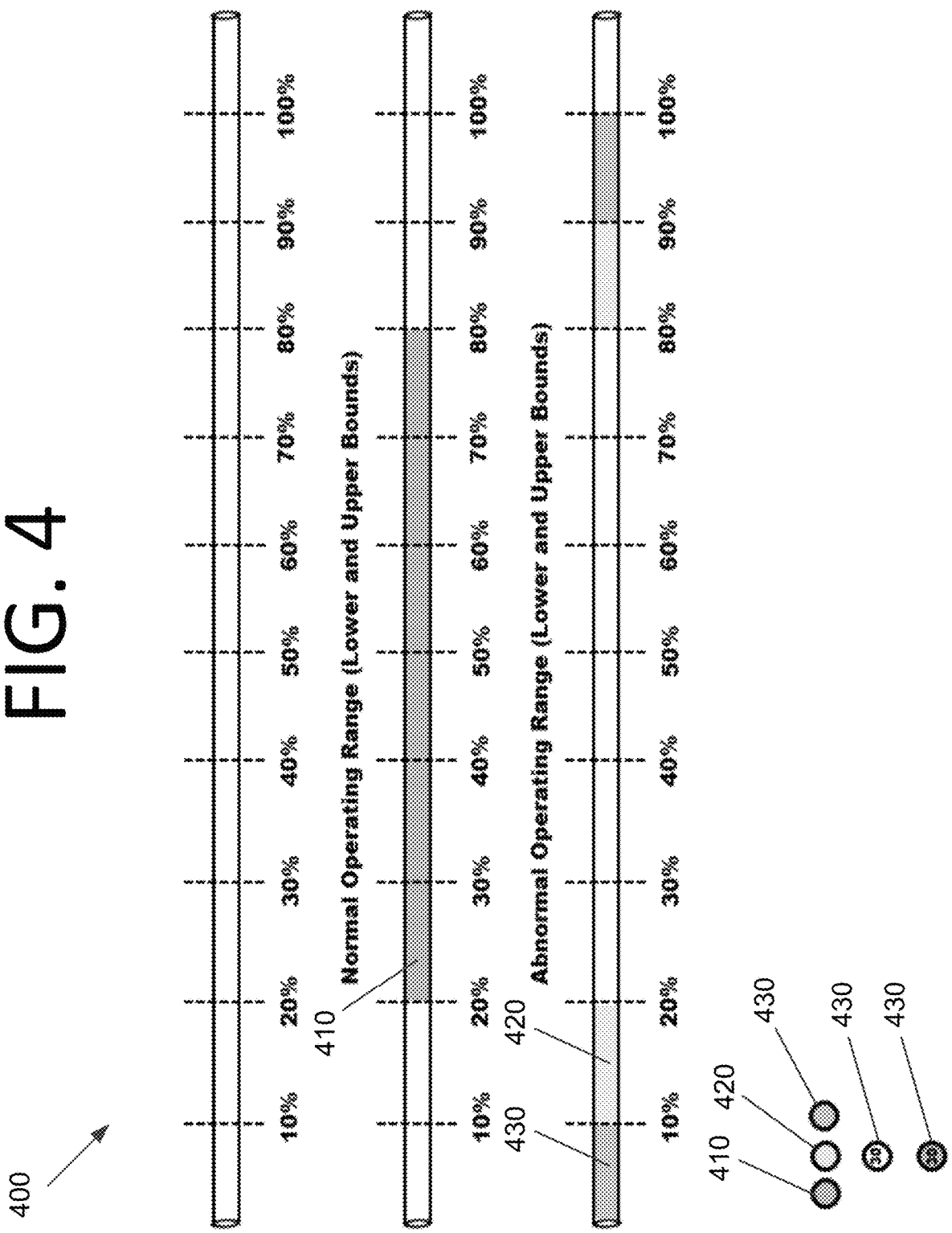
FIG. 4 illustrates a depth meter for a pin, according to an embodiment of the present invention.

As shown in FIG. 4 and discussed in further detail below, pins can take on various forms of metadata to further enhance the user experience. For example, in FIG. 4, a pin 400 can take on statistical distributions to further describe the movement of a pin relative to the statistical distribution. This example shows a normal statistical distribution. However, other statistical distributions include, but are not limited to, a uniform distribution, a Cauchy distribution, a t distribution, an F distribution, a chi-square distribution, an exponential distribution, a Weibull distribution, a lognormal distribution, a Birnbaum-Saunders (fatigue life) distribution, a gamma distribution, a double exponential distribution, a power normal distribution, a power lognormal distribution, a Tukey lambda distribution, an extreme value distribution, a beta distribution, etc.

In FIG. 4, a "normal' operating range 410 can be defined with upper and lower bounds (i.e., lower bound 20% and upper bound 80%). The range from 20% to 80% could further be customized by displaying the color green to indicate a "good" statistical result. A "warning" range 420 could be identified as in FIG. 4, with a lower bound of 10% to 20% and an upper bound of 80% to 90%. The lower bound and upper bound could also be assigned the color yellow to indicate a warning. Furthermore, in FIG. 4, a "critical" range 430 could be identified with a lower bound of 0% to 10% and an upper bound of 90% to 100%. The color red could be assigned to these ranges to indicate a critical value.

Since pins 400 themselves are 3-D in this embodiment, they have a top, a bottom, and a side associated with each pin 400. The side view of each pin 400 could be marked with ranges 410, 420, 430 depending on the statistical distribution for that pin, along with color codings, scale, and statistical distributions, for example. In certain embodiments, the "top" and "bottom" of each pin could take on the same color indication (red, yellow, green, or clear (i.e., to indicate "nothing" or "not applicable" visualized as "clear" space) in this example), as well as the percentage value for quick identification of the operating range. Such pins could be implemented physically, digitally, virtually, or a hybrid thereof enhanced via virtual reality (VR), augmented reality (AR), or mixed reality (MR) in some embodiments. The values (e.g., what data is shown and how, what colors, and where) may be configurable and customizable based on user preferences, defaults, policies, etc.

With such a rich set of metadata, filters can be applied to focus or limit the amount of information to be displayed. For example, if an operator wants to experience the normal operating parameters, he or she could filter on green pins to experience what the 3-D map projects. If the operator filtered on yellow pins, he or she they could experience warning 3-D projections. If the operator filtered on red pins, he or she could experience critical 3D projections. This filtering capability may be extended and/or applied to any metadata associated with the pin in some embodiments without deviating from the scope of the invention.

In some embodiments, and unlike conventional implementations of the MITRE ATT&CK framework, pins may be used to show information regarding cells in the framework to indicate the effectiveness of an attack vector and/or its impact on a given system. A pin can represent any attack vector in some embodiments by encompassing the associated data and metadata to move past a conventional cell in a matrix and provide animated qualities to the attack vector for use in a dynamic and interactive environment.

Figure 3:
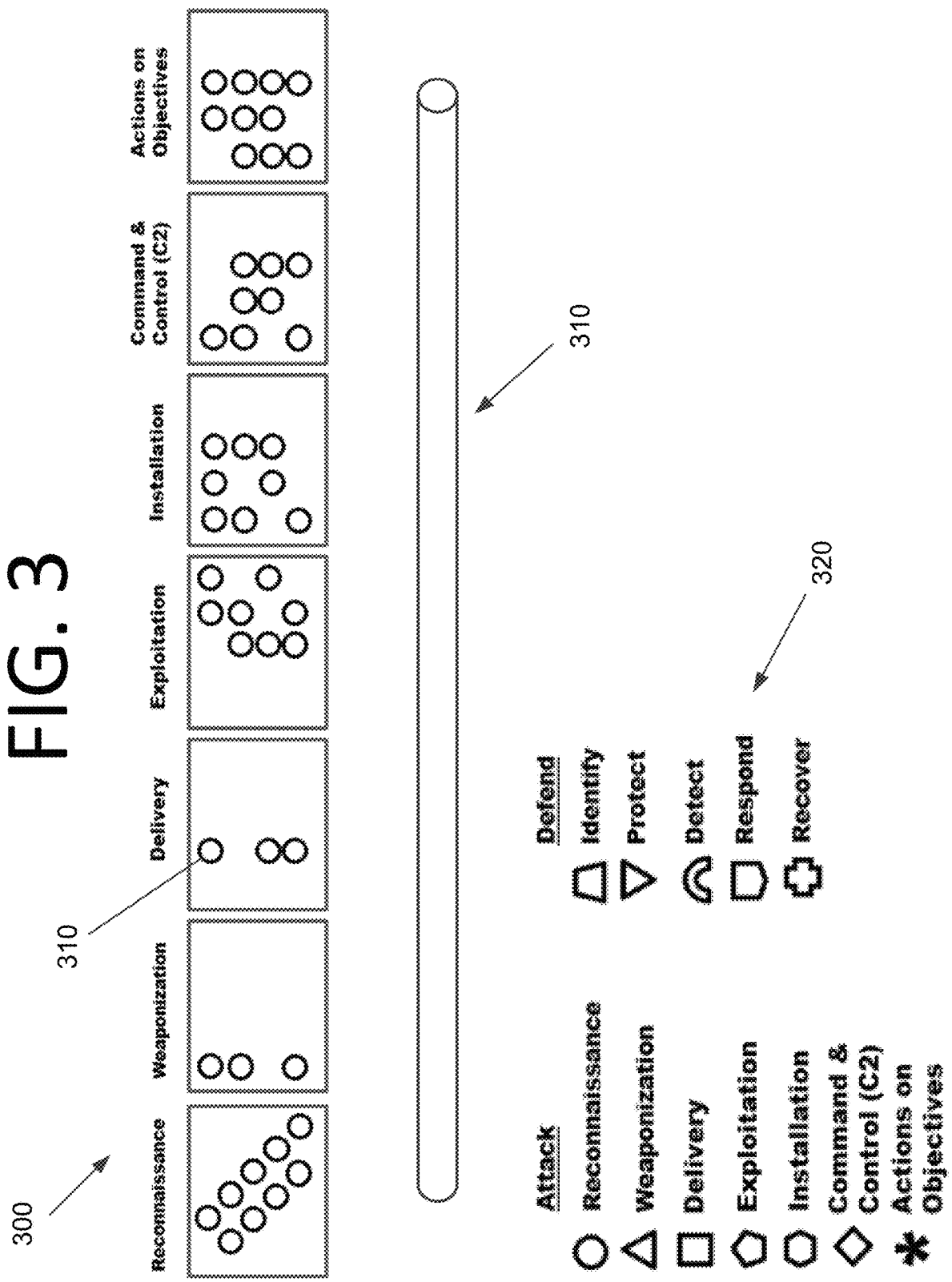
FIG. 3 illustrates advanced persistent threat (APT) cyber kill chain phases of an interactive cybersecurity portfolio interface, according to an embodiment of the present invention.

The metadata associated with a pin can assist machine learning (ML) and artificial intelligence (AI) to hone in on patterns to extrapolate from in some embodiments. Each pin representing an attack vector can then be binned into the cyber kill chain, which is used to describe the various stages of a cyberattack as it pertains to cyber intrusions (reconnaissance, weaponization, delivery, exploitation, installation, command & control, and actions on objectives), as shown in FIG. 3. While a physical or virtual (i.e., electronically displayed) pin may be shown as a cylinder (e.g., pin 310 of FIG. 3), pins may have different and potentially customizable shapes (e.g., shapes 320 of FIG. 3). An attack path is the identification of one or more vulnerabilities that can be exploited by attackers to gain access to specific assets and move between them in a system, thus forming an exploitable path between the assets. In the context of the cyber kill chain, this is represented by moving from left to right across reconnaissance, to weaponization, to delivery, to exploitation, to installation, to command & control, and finally to actions on objectives as a complete attack path.

Cybersecurity exercises often have a "red team" (attack) and a "blue team" (defend). Unlike conventional technologies, which show information pertaining to attacks or defenses, it may be more intuitive as defenders to blend red and blue in a continuous manner to create a "purple" team outcome. Such a display shows the effectiveness of the defenders against the attackers. Multiple attacks could also be combined simultaneously to test defenses. Such a "purple" team display may also provide a mechanism to filter through metadata to make information perceptible.

Each pin may have a depth meter and may move up or down according to its value in an operating range. Each pin may also have a color, a number, or both, representing its current value in the operating range. Such pins may provide both a 3-D representation of data that is more intuitive to users than data on a screen alone.

Overall capability coverage may be indicated by the density of pins mapped to a category and/or defense in depth (DiD) resiliency may be identified by implementing a "depth meter" for each pin (e.g., the number of countermeasures implemented for each attack vector pin), a normal operating range, etc. As used herein, DiD is an approach to cybersecurity in which a series of defensive mechanisms are layered in order to protect valuable data and information. "Data" in this context may be protected throughout its lifecycle, which is the sequence of stages that a particular unit of data goes through from its initial generation or capture to its eventual archiving and/or deletion at the end of its useful life. Data may also be protected while in storage, in transit, or in use. Data integrity may further be ensured by ensuring that digital data is uncorrupted and can only be accessed or modified by those authorized to do so. Data integrity involves maintaining the consistency, accuracy, and trustworthiness of data over its entire lifecycle. "Information" in this context is information that can be gleaned from a compromised application that could provide unauthorized access to the data that the application is designed to protect.

In a DiD approach to cybersecurity, if one mechanism fails, another steps up immediately to thwart an attack. As used herein, a cybersecurity countermeasure is an action, process, technology, device, or system that serves to prevent or mitigate the effects of a cyberattack against a victim, computer, server, network, or associated device (i.e., a defensive mechanism). In certain embodiments, the pins may be physically represented by a 3-D surface, where pins are raised or lowered based on the information in the vectors associated therewith. This may create a 3-D "imprint" of the attack.

Figure 1:
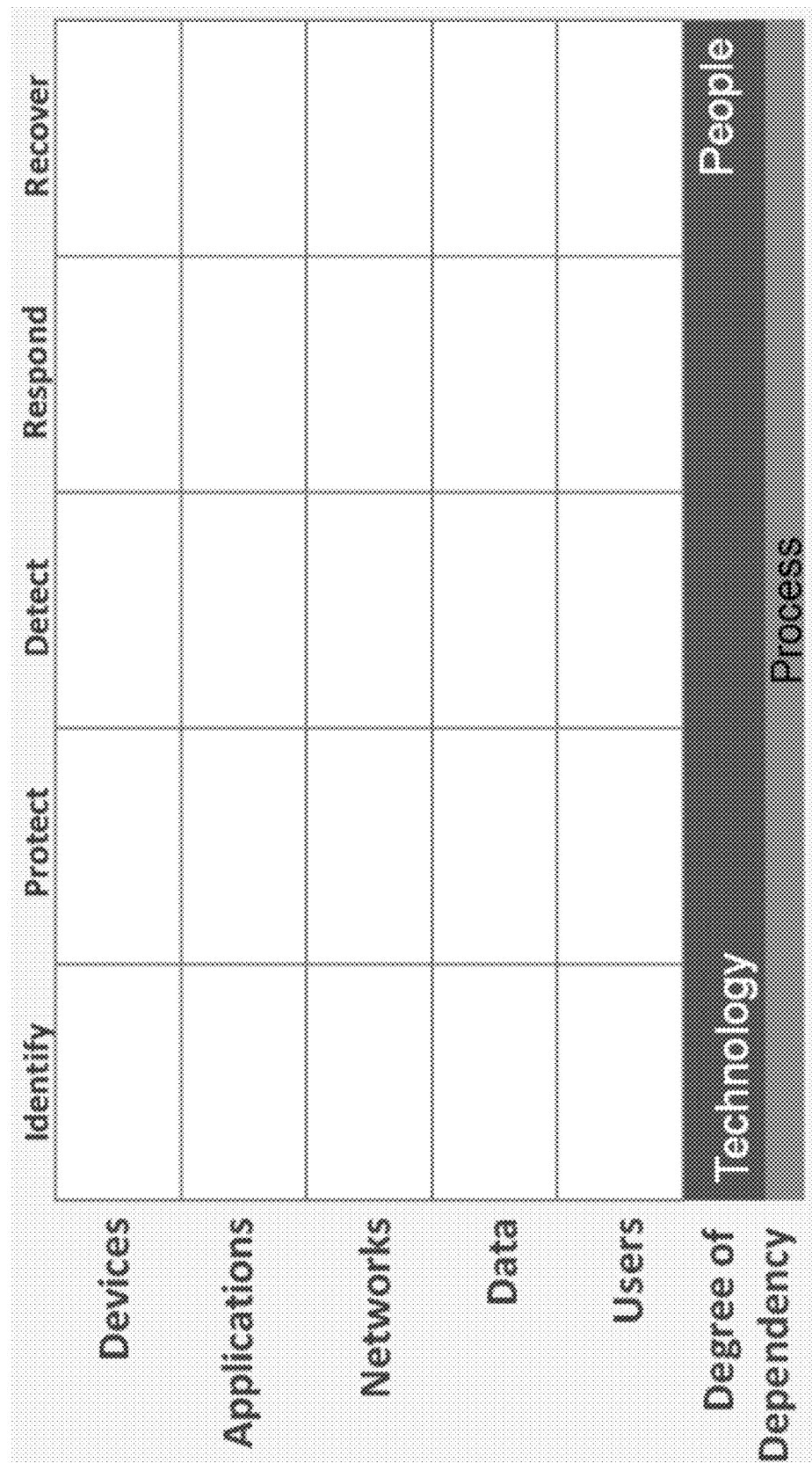
FIG. 1 is a graph illustrating the OWASP Cyber Defense Matrix.
Figure 2:
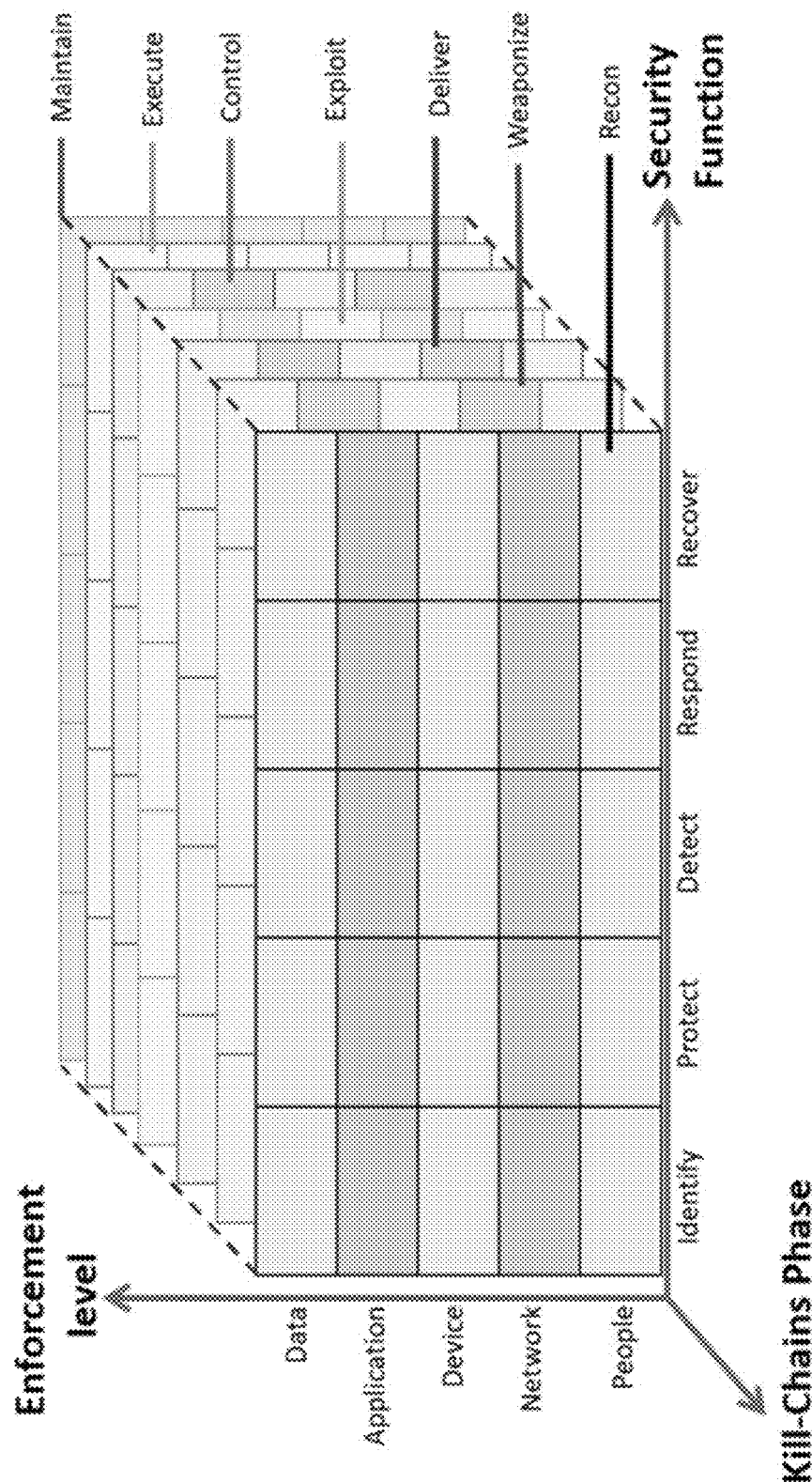
FIG. 2 is a graph illustrating the CyberARM Cyber Defense Matrix.
Figure 5:
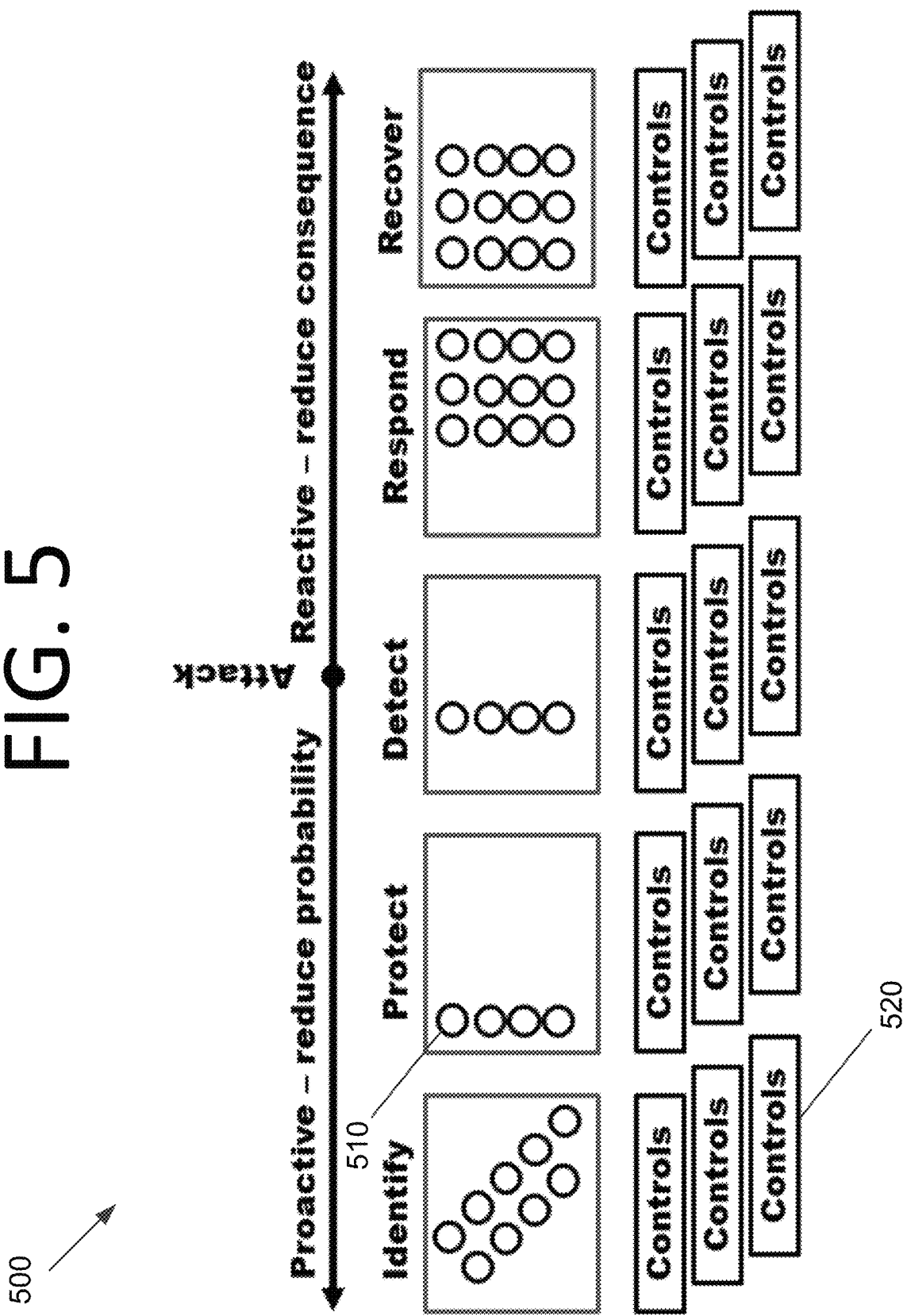
FIG. 5 illustrates cybersecurity functions of an interactive cybersecurity portfolio interface to counter APT cyber kill chain phases, according to an embodiment of the present invention.

As shown in FIG. 5, for example, five cybersecurity functions 500 identified by NIST 800-53 are meant to be performed in parallel in order to form a security framework that can respond dynamically to threats and attacks in real time. Functions 500 are categorized as identify, protect, detect, respond, and recover. The mapping of countermeasures is represented by pins 510. In some embodiments, pins 510 may have shapes corresponding to a respective function 500, potentially similar to shapes 320 in FIG. 3. Controls 520 can be individually mapped to a respective cybersecurity function 500 (i.e., identify, protect, detect, respond, or recover) as countermeasures to each of the respective cyber kill chain components of reconnaissance, weaponization, delivery, exploitation, installation, command & control, and actions on objectives in order to complete a cyber defense matrix. See, e.g., FIG. 2.

Per the above, in certain embodiments, information may be presented in the form of a 3-D matrix. In the context of cybersecurity, one axis may represent the cyber kill chain (e.g., reconnaissance, weaponize, deliver, exploit, control, execute, and maintain), a second axis may represent the National Institute of Standards and Technology (NIST) cybersecurity functions (e.g., identify, protect, detect, respond, and recover) on another axis, and a third axis may represent the enforcement levels (e.g., people, network, device, application, and data) with a more continuous and realistic representation representing the entire supply chain or value chain. See, e.g., FIG. 2. However, it should be noted that other cyber kill chain frameworks and/or other cybersecurity function standards may be used without deviating from the scope of the invention. Aspects of a cybersecurity portfolio may thus be viewed individually or in combination with other aspects by overlaying attack planes upon one another group attack vectors into security control bins, for example.

By doing so, an acquisition officer could make intelligent decisions with respect to how to address cybersecurity gaps in the cybersecurity portfolio for their system. For example, a system may overcompensate on respond controls (reactive) such as anti-virus software, but have few or no protect controls. The cybersecurity portfolio may be data driven to highlight gaps to be addressed and areas with strong capabilities. Furthermore, attack vectors could highlight the most commonly utilized attacks that the system is currently experiencing to prioritize current needs.

Most conventional solutions stop at the level of showing that attacks are occurring and claim to support cybersecurity situational awareness under the guise of a single "pane of glass." However, this alone does not address the full cybersecurity lifecycle, nor do such static solutions provide cybersecurity resiliency. A problem with such conventional solutions is that human beings cannot address the dynamic changes in a real-time environment on an operating system as thousands of attacks and attack vectors occur in parallel by multiple adversaries.

By providing an interactive interface for cybersecurity portfolio management, some embodiments determine and visualize a 3D data structure that shows not only which attacks are occurring, but also the active defenses interacting with those attacks. A human is thus able to see above and below the "iceberg" in scale, quantity, and magnitude across the entire cybersecurity lifecycle. DevSecOps can thus be enabled as a part of the mission instead of adding cybersecurity at the end.

Some embodiments provide an interface for humans to operate their missions, enforce human-on-the-loop decisions, and enable automation of repeatable tasks, mundane tasks, and/or best practices such that the human can focus on the mission rather than the information technology (IT) problem. Playbooks may capture pre-canned responses to attacks and automate them. This further enhances simulated cyber warfare scenarios, prepares for training and maintaining battle readiness, and dominates throughout a cyberattack, achieving cyber resiliency. In certain embodiments, pins may have different color regions on the same pin and/or be clear, per the above.

In certain embodiments, rather than providing a virtual representation of information, a 3-D physical representation may be provided, allowing users to "experience" the information (e.g., an attack surface area for cybersecurity). Physical hardware that facilitates interaction via touch, sound, taste, and/or smell can work in collaboration with sight enhanced with infrared or AR/VR technologies. For example, pins may be physically implemented, virtually implemented, implemented as a hybrid thereof and enhanced by VR or AR. AR and VR have the ability to alter the user's perception of the world. Where they differ, however, is in the user the perception of user presence. VR is able to transpose the user. Through closed visors or goggles, VR blocks out the room and puts the user's presence elsewhere.

AR, however, takes the user's current reality and adds digital augmentations thereto. This may be accomplished with clear visors, for example. With VR, a user can swim with sharks. With AR, a shark may pop out of a business card, for example. While VR is more immersive, AR may potentially provide more freedom for the user and provide more possibilities for marketers because it does not need to be a head-mounted display.

Multiple senses may also be targeted. Combining visual information that clashes with sound, for example, may provide sensory crosstalk that causes what an individual sees to alter what that individual hears. When one sense deteriorates or drops out, another sense may pick up the slack. For instance, people who are blind can train their hearing to help them "visualize the world around them. People who are both blind and deaf can use touch to help them interpret speech. For individuals with a condition called synesthesia, the senses collide dramatically to form a kaleidoscope of the senses in which chicken tastes like triangles, a symphony smells of baked bread, words bask in a halo of red, green, or purple, etc. Synesthesia is a condition in which one sense (e.g., hearing) is simultaneously perceived as if by one or more additional senses, such as sight. Another form of synesthesia joins objects, such as letters, shapes, numbers, or names, with a sensory perception, such as smell, color, or flavor. Those with synesthesia thus have a particularly curious cross-wiring of the senses in which activating one sense spontaneously triggers another.

Some embodiments may map additional information from one sense to another either in time of need or in time of overload to enable better prioritization, decision making, and risk management. Cyber awareness and command and control (C2) can be distributed across the various senses in a mesh network of human-machine interfaces. By intentionally enabling synesthesia via a 3D representation of data, the visually limited "single pane of glass" can be expanded upon to a much larger sensory surface area that includes other senses (i.e., touch, sound, taste, and/or smell), creating a 360 degree, immersive experience.

FIG. 3 illustrates APT cyber kill chain phases 300 of an interactive cybersecurity portfolio interface, according to an embodiment of the present invention. Each pin 310 represents an attack vector. However, it should be appreciated that any information for any desired application may be represented without deviating from the scope of the invention. In FIG. 3, the attack vectors are grouped into phases, such as the depicted APT cyber kill chain phases.

Interface 300 shows mappings of attack vector pins 310 to these phases. Each pin 310 can be binned into stages of the cyber kill chain. In certain embodiments, the pins may have different end shapes 320 that further differentiate respective categories. These shapes may be binned under respective cyber defense functionality, as shown in FIG. 5.

In some embodiments, each pin can move in or out independently from other pins. Thus, in the cybersecurity example above, each pin representing an attack vector may move independently from one another as various attacks in various stages of development are launched against a target. FIG. 4 illustrates a depth meter 400 for a pin, according to an embodiment of the present invention. Ends of the pin may indicate its operating range color. By way of nonlimiting example, a first color may indicate a normal operating range 410 (e.g., the depicted 20-80%), a second color may indicate a first deviation from normal operation 420 (e.g., 10-20% or 80-90%), a third color may indicate second, further deviation from normal operation 430 (e.g., 0-10% or 90-100%), etc. In some embodiments, the ends of the pins may include a number of the operating range, or a number and color of the operating range. The length or depth of each pin may represent the "dialability" (i.e., strength) of the technical control against each attack vector per attack phase (i.e., kill chain).

FIG. 5 illustrates cybersecurity functions 500 of an interactive cybersecurity portfolio interface to counter APT cyber kill chain phases, according to an embodiment of the present invention. As with FIG. 3, pins 510 are used. However, pins 510 pertain to countermeasures (e.g., countermeasure 730 of FIG. 7F) that can be mapped to controls 520 that can be used for each phase, with some being proactive and others being reactive. Some technical controls can only be on or off (binary) while others can be scalable. The number of pins (i.e., pin density) may indicate strengths or gaps in capabilities. Furthermore, attacks and defenses being played out in real time may be displayed simultaneously.

Data Structures

Various formats and data structures may be used without deviating from the scope of the invention. For instance, in some embodiments, JavaScript Object Notation (JSON) may be used. JSON is an open standard file format that uses human-readable text to transmit data objects including attribute-value pairs and array data types (or other serializable values). JSON is a language-independent data format that was derived from JavaScript. Many modern programming languages include code to generate and parse JSON format data. The official Internet media type for JSON is application/json and JSON file names use the extension ".json".

An example pin data structure written in JSON for a specific spearphishing attack is included below.

```
> {
  "Pin": "Cyber Kill Chain",
  "Category": "Reconnaissance",
  "Attack Type": "Initial Access",
  "Attack Vector": "Spearphishing Link",
  "Campaign": {
    "Delivery": "email",
    "Email Type": "Work",
    "Company": "The Aerospace Corporation",
    "From": "spam@somemail.com"
    "To": target@aero.org
    "Subject": "Your Open Enrollment is Now Available"
    "URL": "www.somethingbad.com"
    "Date": "MM/DD/YYYY"
    "Time of Day": "12 noon pacific"
  "Day of Week": "Friday"
  "Statistical Distribution": "https://github.com/errcw/gaussian"
  "Normal": "Green"
  "Normal High": "80"
  "Normal Low": "20"
  "Warning": "Yellow"
  "Warning High": "90"
  "Warning Low": "10"
  "Critical": "Red"
  "Critical High": "100"
  "Critical Low": "0"
  "Priority": "9"
  "Compromised": "Yes"
  "Device Type": "Laptop"
  "Network Type": "external"
  "Network Location": "Coffee Shop"
  "IP Address": "123.456.789.000"
  "IP Address Attribution": "APT 1"
  "Adversary Name": "PLA Unit 61398"
  "Adversary Description": "PLA Unit 61398 (also known as APT 1, Comment
```

Crew, Comment Panda, GIF89a, and Byzantine Candor) (Chinese: 61398 部队, Pinyin: 61398 budui) is the Military Unit Cover Designator (MUCD) of a People's Liberation Army advanced persistent threat unit that has been alleged to be a source of Chinese computer hacking attacks. The unit is stationed in Pudong, Shanghai."
"Adversary History": "Until 2013, the Government of China has consistently denied that it is involved in hacking. In response to the Mandiant Corporation report about Unit 61398, Hong Lei, a spokesperson for the Chinese foreign ministry, said such allegations were 'unprofessional.' In 2013, China changed its position and openly admitted to having secretive cyber warfare units in both the military and the civilian part of the government-however, the details of their activities were left to speculation. As a show of force towards the rest of the global community the Chinese government now openly lists their abilities when it comes to digital spying and network attack capabilities."
```
var TTP= [{
    "Tactics, Techniques, and Procedures (TTPs) ": "APT1 Exposing One of
    China's Cyber Espionage Units"
    "URL": "https://www.fireeye.com/content/dam/fireeye-
    www/services/pdfs/mandiant-apt1-report.pdf"
    var ATTACK LIFE CYCLE= [{
        "Initial Compromise": "The Initial Compromise represents the methods
        intruders use to first penetrate a target organization's network. As with
        most other APT groups, spear phishing is APT1's most commonly used
        technique. The spear phishing emails contain either a malicious
        attachment or a hyperlink to a malicious file. The subject line and the
        text in the email body are usually relevant to the recipient. APT1 also
    creates webmail accounts using real peoples' names-names that are
    familiar to the recipient, such as a colleague, a company executive, an
    IT department employee, or company counsel-and uses these
    accounts to send the emails."
    "Establishing A Foothold": "Establishing a foothold involves actions
    that ensure control of the target network's systems from outside the
    network. APT1 establishes a foothold once email recipients open a
    malicious file and a backdoor is subsequently installed. A backdoor is
    software that allows an intruder to send commands to the system
    remotely. In almost every case, APT backdoors initiate outbound
    connections to the intruder's 'command and control' (C2) server. APT
    intruders employ this tactic because while network firewalls are
    generally adept at keeping malware outside the network from initiating
    communication with systems inside the network, they are less reliable
    at keeping malware that is already inside the network from
    communicating to systems outside. While APT1 intruders occasionally
    use publicly available backdoors such as Poison Ivy and Gh0st RAT,
    the vast majority of the time they use what appear to be their own custom
    backdoors. We will describe APT1's backdoors in two categories:
```

```
   Beachhead Backdoors and Standard Backdoors. "
   "Privilege Escalation": "Escalating privileges involves acquiring items
      (most often usernames and passwords) that will allow access to more
      resources within the network. In this and the next two stages, APT1
   does not differ significantly from other APT intruders (or intruders,
   generally). APT1 predominantly uses publicly available tools to dump
   password hashes from victim systems in order to obtain legitimate user
   credentials. "
   "Internal Reconnaissance": "In the Internal Reconnaissance stage, the
   intruder collects information about the victim's environment. Like most
   APT (and non-APT) intruders, APT1 primarily uses built-in operating
   system commands to explore a compromised system and its networked
   environment. Although they usually simply type these commands into
   a command shell, sometimes intruders may use batch scripts to speed up
   the process. "
   "Lateral Movement": "Once an APT intruder has a foothold inside the
   network and a set of legitimate credentials, it is easy for the intruder(s)
   to move around the network undetected. They can connect to shared
   resources on other systems. They can also execute commands on other
   systems using the publicly available "psexec" tool from Microsoft
   Sysinternals or the built-in Windows Task Scheduler ("at.exe"). These
   actions are hard to detect because legitimate system administrators also
   use these techniques to perform actions around the network."
   "Maintain Presence": "In this stage, the intruder takes actions to ensure
   continued, long-term control over key systems in the network
   environment from outside of the network. APT1 does this in three ways:
         (1) Install new backdoors on multiple systems; (2) Use legitimate VPN
         credentials; and (3) Log in to web portals."
         "Completing the Mission": "Similar to other APT groups we track, once
         APT1 finds files of interest they pack them into archive files before
         stealing them. APT intruders most commonly use the RAR archiving
         utility for this task and ensure that the archives are password protected."
      }]
   }]
},
"phoneNumbers": [
   {
     "type": "home",
     "number": "212 555-1234"
   },
   {
     "type": "office",
     "number": "646 555-4567"
   },
   {
     "type": "mobile",
     "number": "123 456-7890"
   }
],
   "children": [ ],
   "spouse": null
}
```

The above data structure is provided by way of example, and any suitable data structure for representing pin data for any desired purpose (including non-cybersecurity applications) may be used without deviating from the scope of the invention.

Figure 6:
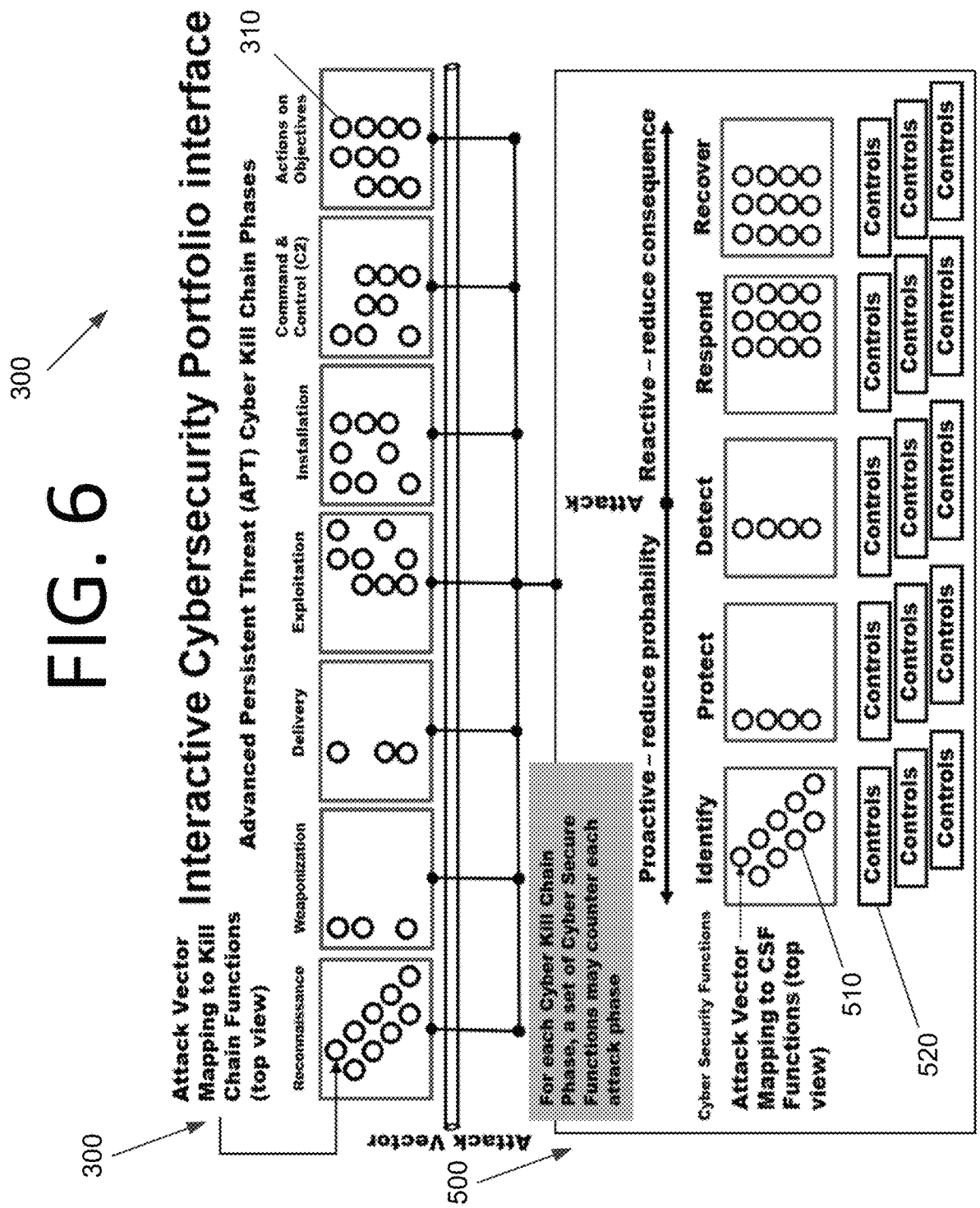
FIG. 6 illustrates APT cyber kill chain phases and cybersecurity functions of an interactive cybersecurity portfolio interface together, according to an embodiment of the present invention.

FIG. 6 illustrates APT cyber kill chain phases 300 and cybersecurity functions 500 of an interactive cybersecurity portfolio interface together, according to an embodiment of the present invention. Pins 310 represent attack vectors that are binned in cyber kill chain phases 300, which is used to describe the various stages of a cyberattack as it pertains to cyber intrusions (reconnaissance, weaponization, delivery, exploitation, installation, command & control, and actions on objectives).

Five cybersecurity functions 500 are categorized as identify, protect, detect, respond, and recover. The mapping of countermeasures is represented by pins 510. Controls 520 can be individually mapped to a respective cybersecurity function 500 (i.e., identify, protect, detect, respond, or recover) as countermeasures to each of the respective cyber kill chain components of reconnaissance, weaponization, delivery, exploitation, installation, command & control, and actions on objectives in order to complete a cyber defense matrix.

Figure 7A:
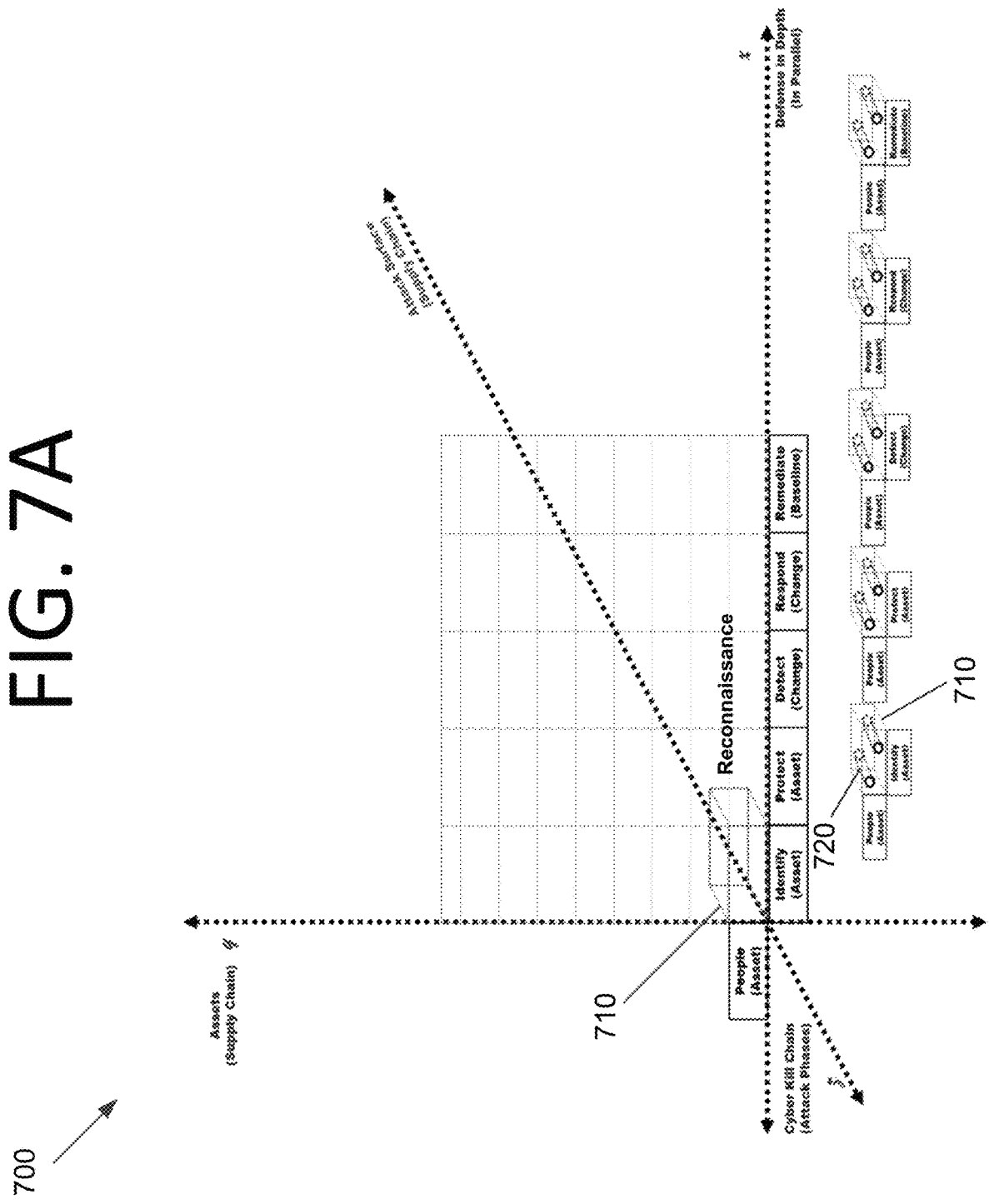
FIG. 7A is a graph illustrating cybersecurity defense assets, supply chain assets, and cyber kill chain attack phases in a DiD strategy, according to an embodiment of the present invention.
Figure 7B:
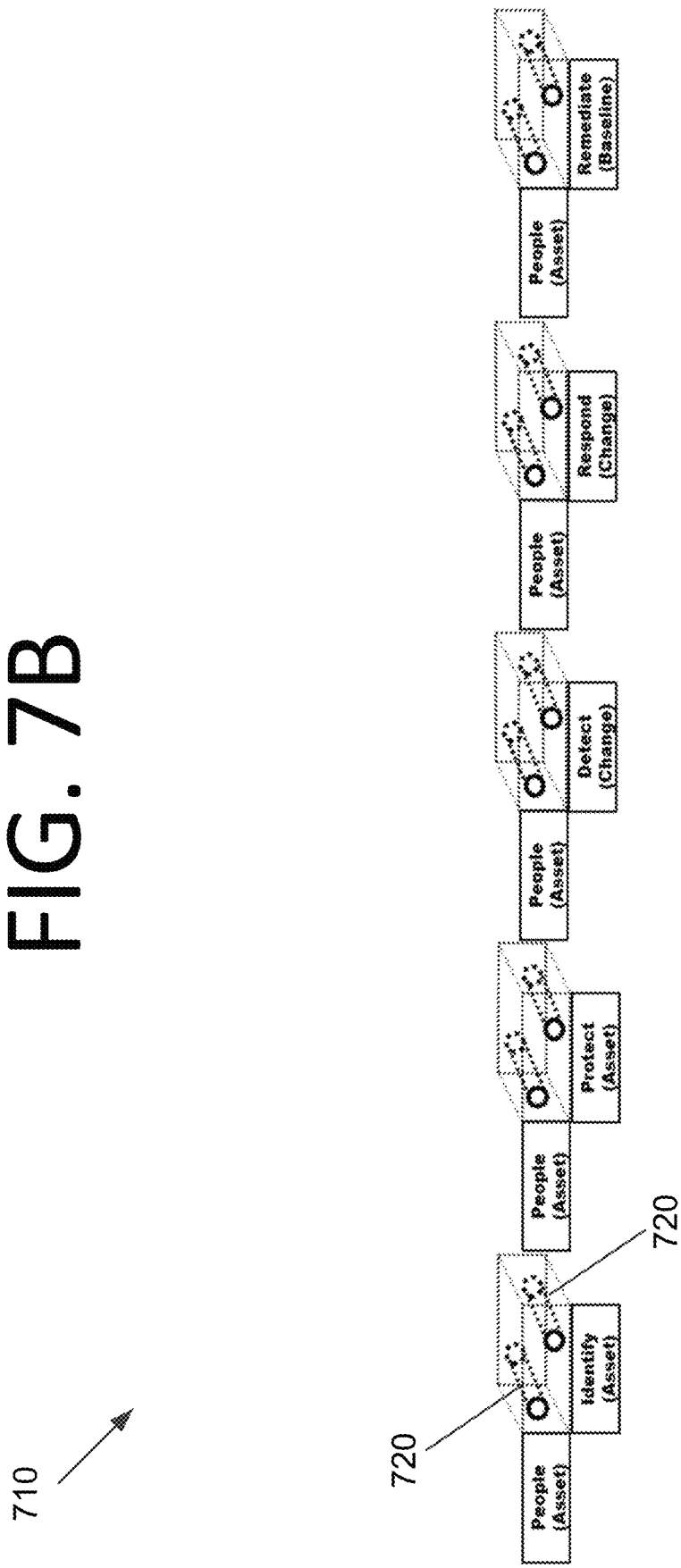
FIG. 7B illustrates identify/people/reconnaissance attack surface cells, according to an embodiment of the present invention.

FIG. 7A is a graph 700 illustrating cybersecurity defense assets, supply chain assets, and cyber kill chain attack phases in a DiD strategy, according to an embodiment of the present invention. Cell 710 represents an identify/people/ reconnaissance attack surface. As seen more clearly in FIG. 7B, each identify/people/reconnaissance attack surface cell 710 includes two attack vectors 720, represented as pins.

With respect to more than one instance of attack surface cells 710 being shown, from a defender's point of view, one attack surface cell 710 is provided for each of the DiD categories (i.e., identify, protect, detect, respond, and remediate) to be defended in parallel against either the same attack vector or multiple attack vectors. In other words, there could be anywhere from zero attack vectors to many attack vectors for each cell 710. Two attack vectors 720 are shown here by way of example.

In some embodiments, the color of cell 710 may change based on the number of attack vectors or defense measures.

For instance, a cell may be clear if it has no attack vectors or defense measures, green if there are a number of defense measures, and red if there are a number of attack vectors without defense measures. The color may also be shaded to lighter to darker shades of red (i.e., degree of vulnerability) or green (i.e., degree of DiD) based on how many more attack vectors there are than defense measures, or vice versa. In some embodiments, a number from 0 to N may be shown showing the densities of attacks, countermeasures, or both.

The very same attack surface may look different from an attacker's point of view (e.g., cyber kill chain phases 300 of FIGS. 3 and 6). The attack vectors are aligned to the cyber kill chain phases (i.e., reconnaissance, weaponization, delivery, exploitation, installation, command & control (C2), and actions on objectives) and any attack vector can occur in a single instance or in multiple instances. From an attacker's vantage point, the goal is to achieve a successful attack path, such as shown in FIG. 7E.

Figure 7C:
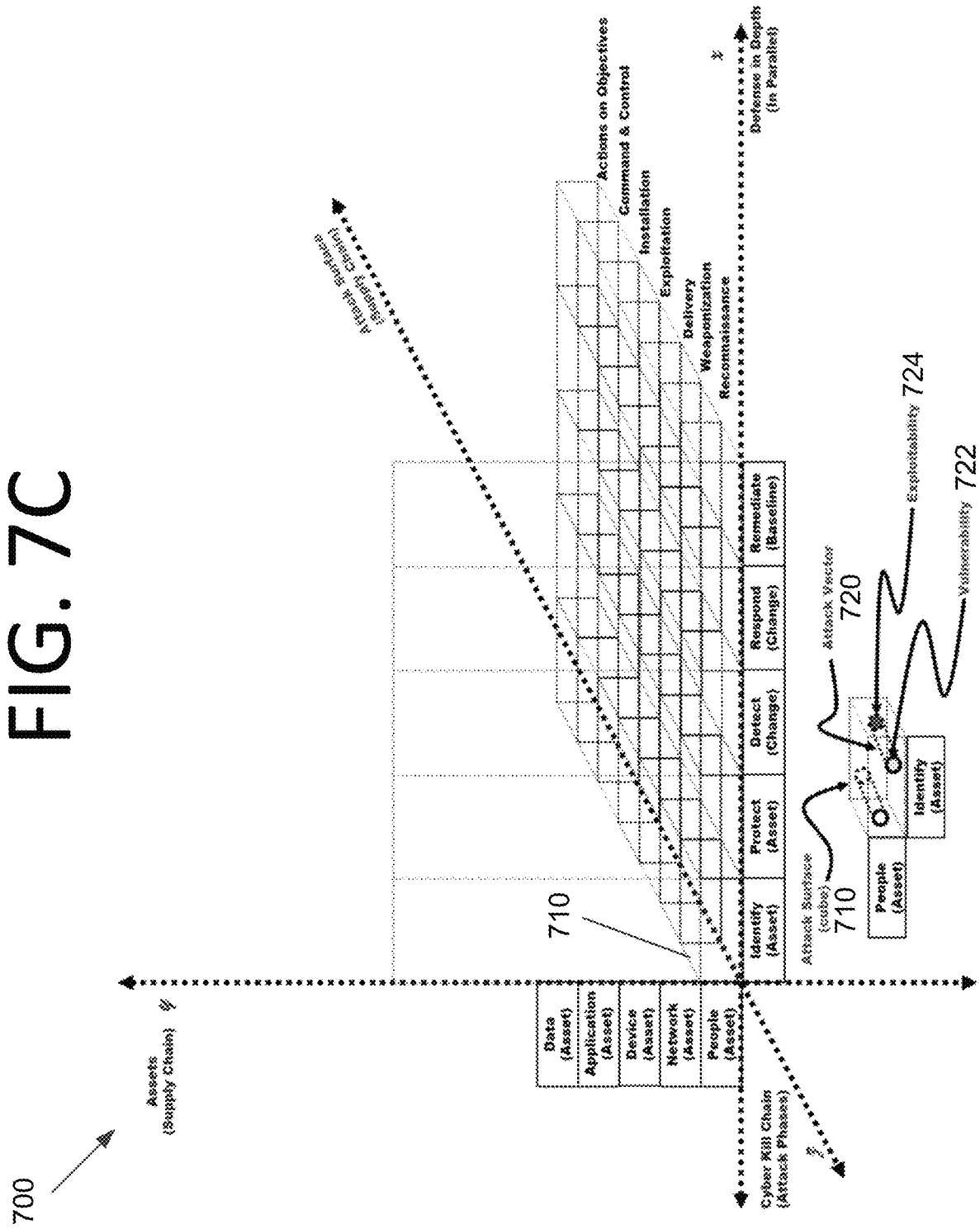
FIG. 7C illustrates the graph of FIG. 7A, but includes all cells for the people supply chain asset, according to an embodiment of the present invention.
Figure 7D:
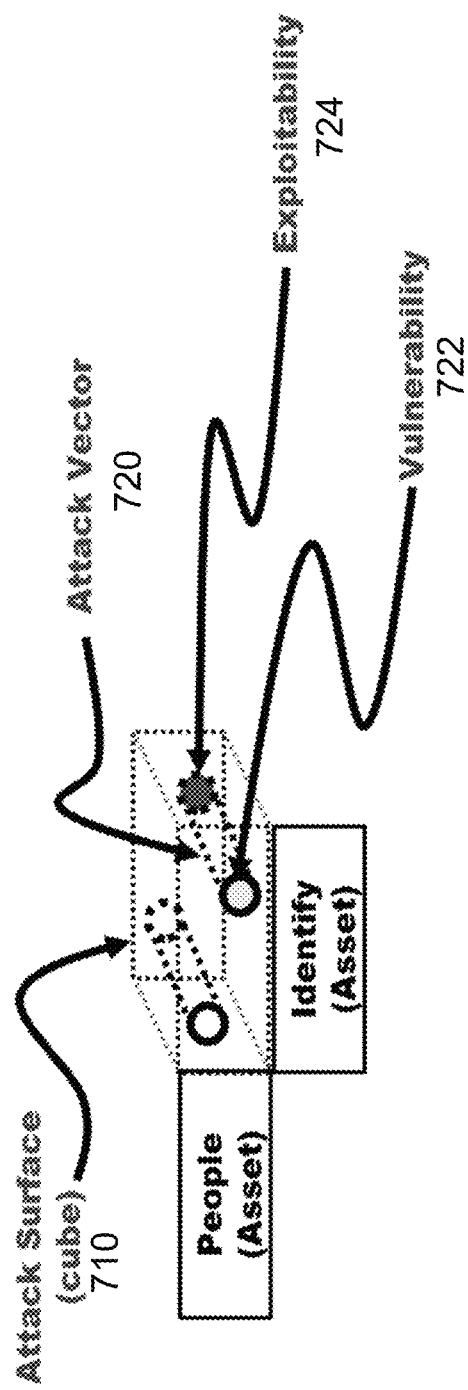
FIG. 7D is an enlarged view illustrating the identify/people/reconnaissance attack surface cell, according to an embodiment of the present invention.
Figure 7E:
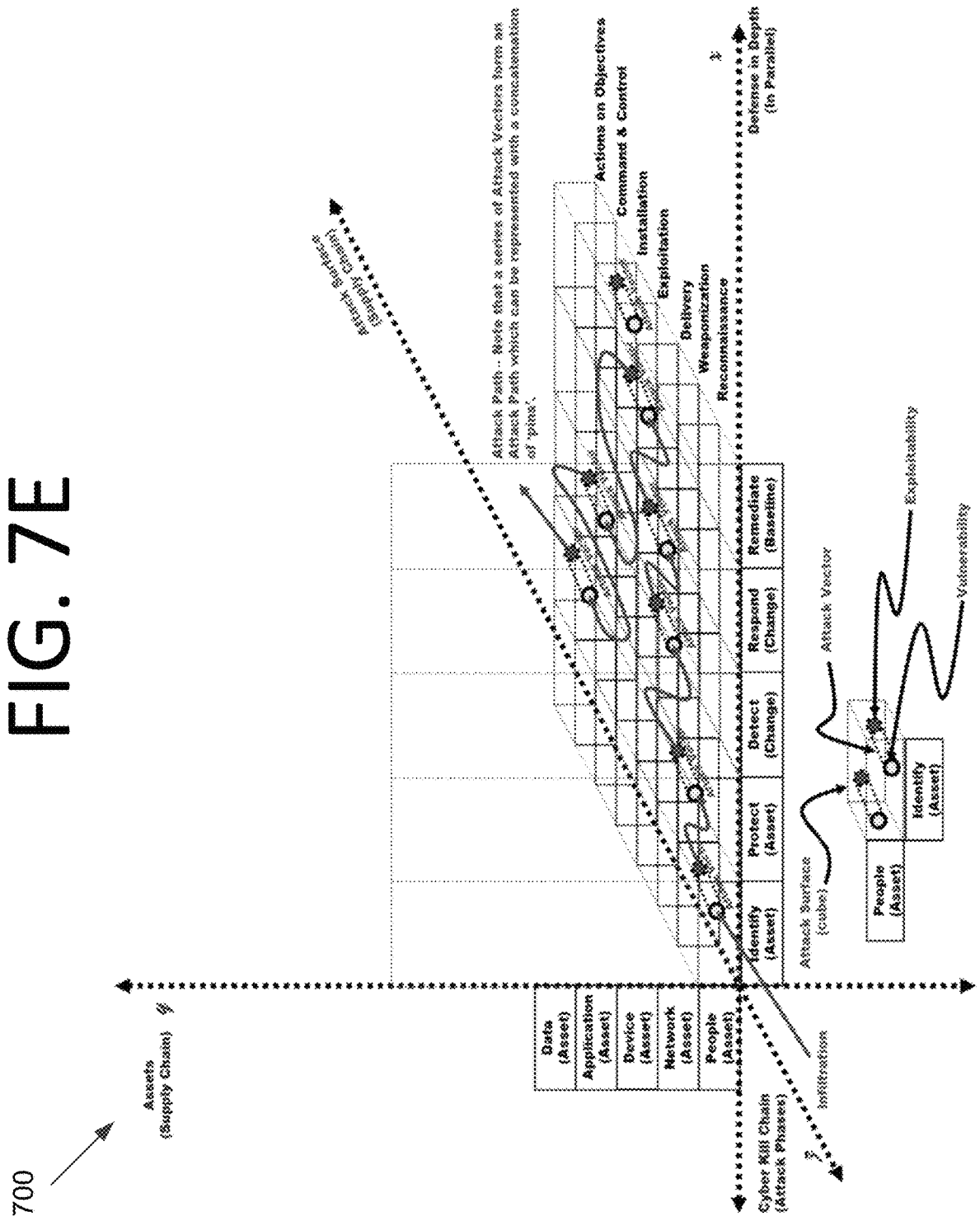
FIG. 7E illustrates the graph and cells of FIG. 7C, but where exfiltration has occurred, according to an embodiment of the present invention.
Figure 7F:
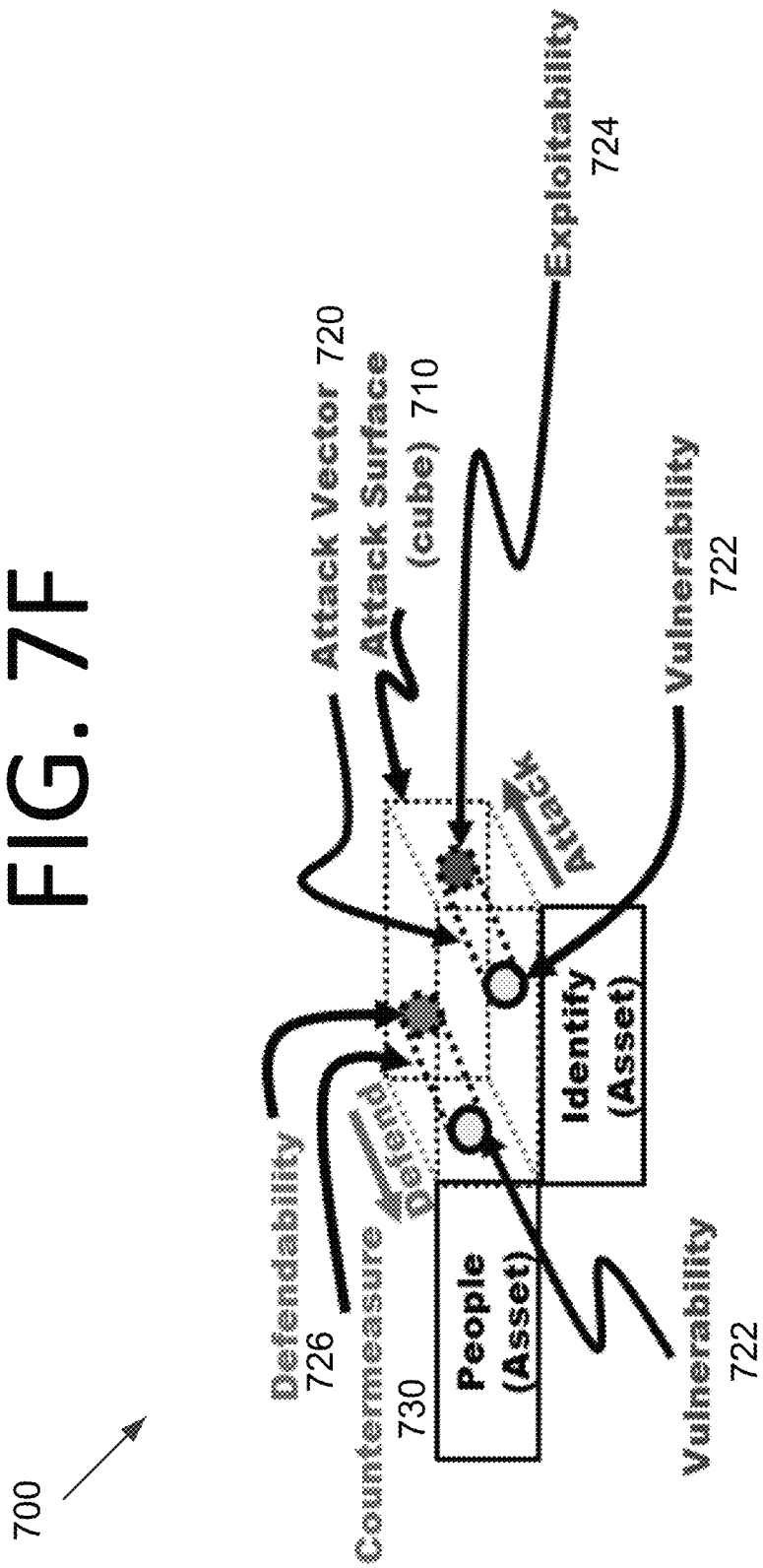
FIG. 7F illustrates the identify/people/reconnaissance attack surface cell with a deployed countermeasure, according to an embodiment of the present invention.

Graph 700 of FIG. 7C includes all cells for the people supply chain asset. As seen below graph 700, and enlarged in FIG. 7D, right attack vector 720 represents a vulnerability 722 which is susceptible to an exploitability 724. If an exploit is applied, then an attack vector 720 has been taken, thus defeating one layer of a DiD strategy.

A series of attack vectors 720 form an attack path. This can be viewed as a concatenation of pins. Referring to FIG. 7E, if a sequence of exploits makes its way through the cyber kill chain past all DiD mechanisms, then exfiltration is enabled (i.e., actions on objectives).

One of the hardest cybersecurity capabilities to achieve is the successful identification of defect or vulnerability escapes from testing. The goal is to find these defects and vulnerabilities before they get to production. However, with the advent of agile development and DevSecOps, a potential byproduct of software deployments is new software defects that are found in production, either during regression/acceptance testing or by users or customers later on. It is likely that new application errors, performance problems, quirky user experience problems, or other issues will be found as this tends to be the nature of the software development process. Generally, these issues can be categorized as false positives, false negatives, and vulnerability chaining.

An advantage of representing data in the manner of some embodiments for a cybersecurity portfolio is to highlight actual and successful attack paths in a cybersecurity matrix to prioritize these attack vectors above other unsuccessful paths (i.e., finding the needle in a stack of needles). Since "actual" or "true" attack paths can be discovered and captured, developers can focus on prioritized attack vectors and attack paths as-is on the target system.

As a result, some corollaries also follow. Application of some embodiments allows false positives to be identified and graphically illustrated to the defender, potentially marking them as a false positive with text, a color, etc. A false positive is a test result that incorrectly indicates that a particular condition or attribute is present. When identified as being false positives, these test results can be ignored and actual attack paths can be prioritized and addressed. Likewise, a false negative is a test result that incorrectly indicates that a particular condition or attribute is absent when in fact it is present. These results can be annotated as being false negatives and can be added as valid attack paths that should be prioritized and addressed.

Vulnerability chaining is a well-established technique of adversaries that occurs typically during the reconnaissance process. As adversaries work to enumerate a digital footprint of a target, they identify direct and peripheral vulnerabilities and weaknesses in hardware, firmware, and software to exploit. The result is the ability to link one vulnerability to another, creating a chain that an attacker can use to move deeper into or through a target network. Vulnerability chaining can be exceptionally powerful when chaining low criticality vulnerabilities, which are often overlooked in favor of high criticality vulnerabilities. Such vulnerabilities may be successfully chained to become more than the sum of their parts. While alone they do not pose much risk, together, and when placed into context, they can present a significant collective vulnerability.

Many such combinations are hard to automate. While some can of course be combined automatically, others require human creativity to fully understand the potential impact. Vulnerability chaining is one of the hardest attack paths to capture and identify due to these characteristics. However, some embodiments can provide a mechanism to more readily identify where vulnerability chaining may occur, and potentially enable automation of defenses to protect against these attack paths. As previously mentioned, once captured and articulated into metadata, playbooks can capture sequence, context, and content to fully automate for testing and remediation purposes. FIG. 7E captures all types of attack paths and includes and example of vulnerability chaining. Thus, while the individual attack vectors that make up the vulnerability chain may not be critical, the vulnerability chain itself can be categorized as a high criticality attack path and prioritized accordingly so it is addressed.

Some embodiments can capture, identify, and highlight cross-over attack vectors, where adversaries leverage tactics, techniques, and procedures of one or more other adversaries to accelerate penetration into a system and attempt to create plausible deniability with respect to attribution to an attack (i.e., denial that they were responsible). Real world examples include a Russian advanced persistent threat (APT), which is a government-backed hacking unit, hacked into the infrastructure of an Iranian APT in 2017, using the command and control servers of the Iranian APT to drop malware on computers already infected with oil rig hacking tools, as well as Iranian Facebook® trolls using Russian tactics to interfere with U.S. elections. One skilled in the art can readily appreciate how some embodiments may be combined with security orchestration and response (SOAR) tools to enable DevSecOps operations to automate responses into playbooks.

Figure 7G:
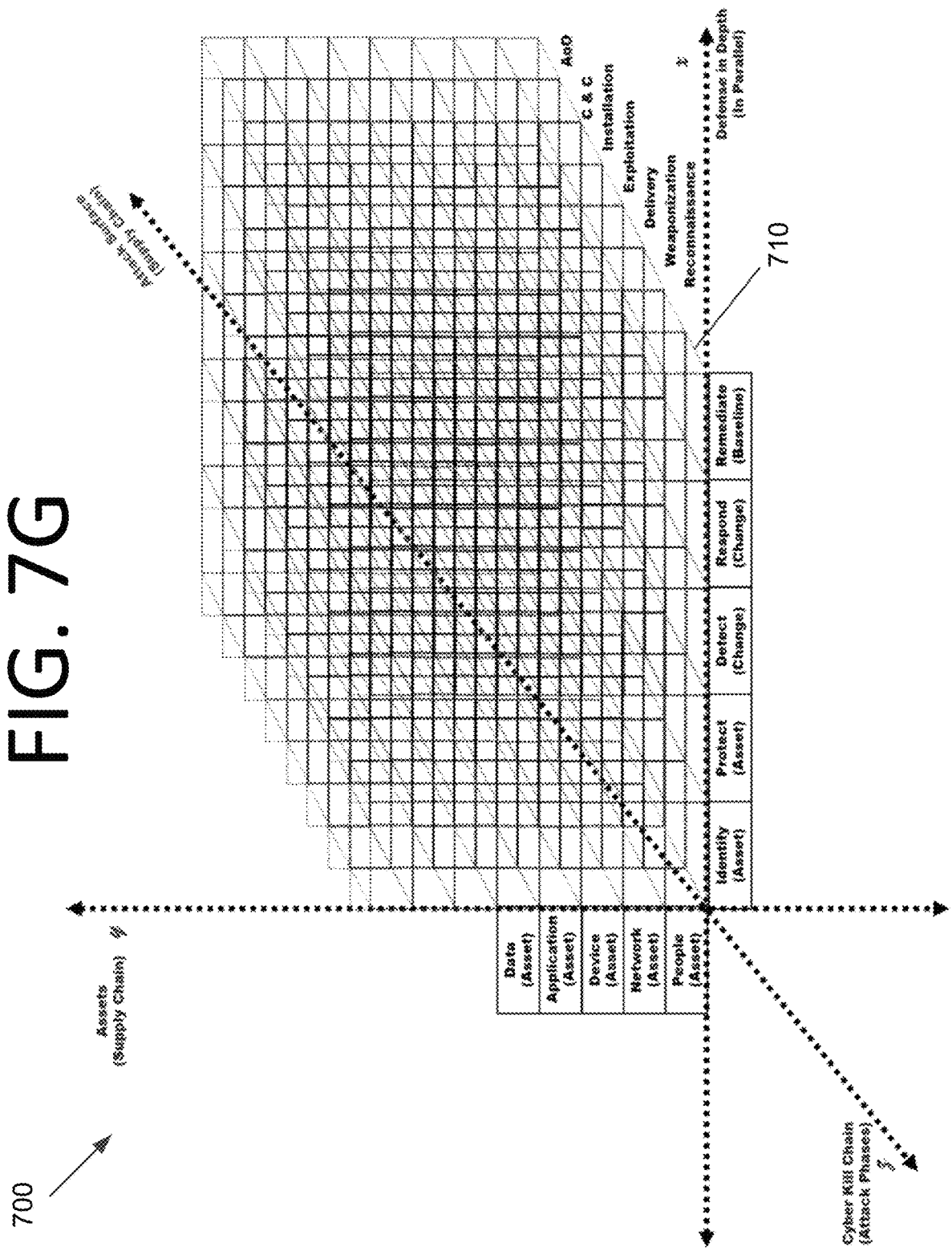
FIG. 7G illustrates the graph of FIG. 7A with all cells in the cybersecurity matrix included, according to an embodiment of the present invention.

As shown in FIG. 5, lateral movement across the cyber kill chain phases is the current state of the art of tactics, techniques, and procedures (TTPs) used in cyber defense. A person skilled in the art will recognize that some embodiments of the present invention may facilitate better understanding and visualization to also include vertical movement, as shown in FIG. 7G, to allow 3-D attack vector understanding and mapping to create and illustrate potentially unknown attack paths throughout a system.

In certain embodiments, four dimensions can be represented by adding time as a variable such that a time series or sequence can capture and illustrate how an APT develops over time within a system. Such embodiments can prioritize and address these APTs in a timely manner. This omnidirectional movement over time may be presented as part of the novel cyber portfolio management and situational awareness tool of some embodiments.

In certain embodiments, "modulation" techniques, such as phase, frequency, etc., may be used to uncover covert communication mechanisms. Typical adversary TTPs distribute the APT attack path in partial capabilities over time, attack surfaces, IT, OT, power lines, wireless or wired interfaces, power modulation, and/or clock manipulation in order to obfuscate, encrypt, or increase complexity to hide "in the noise" of normal traffic or data flows, or repurpose normal actions into nefarious outcomes. For example, a power "blip" could just be a random or inconsequential event, or it could be a low bandwidth cover channel to indicate that a "feature" has been enabled. A defender can determine whether a time-phased attack is occurring using some embodiments since known attack vectors and paths can be recorded, traced, paused, and played back. Portions of a known attack vector or attack path can be analyzed and compared, and differences or similarities can be noted to extrapolate to known, leveraged, shared, or camouflaged adversarial TTPs.

In certain embodiments, the phenomenon of quantum teleportation between two different chips may be used, where a change in one environment symbiotically effects the other simultaneously and in parallel. This may enable "true" ground references in traditional satellite architectures.

Attack paths can be used to model adversary TTPs. TTPs may be recorded and played back in some embodiments to capture, analyze, simulate, and teach defenders how to counteract attack pattern(s) employed by one or more adversaries, help define and hone incident response actions by defenders, capture both adversary and defender actions into playbooks to capture, baseline, update, and manage blue and red team interactions to achieve near-real time purple team tabletop exercises to encourage joint teamwork, share insights beyond reporting alone, create a strong feedback loop, and identify gaps in DiD controls that can realistically be implemented for immediate improvement.

The utilization of pins to visually represent the above interactions improves understanding, comprehension, retention, learning, and practicing the art of cyberwarfare to sharpen and refine cyberwarfare skillsets in a realistic, time-sensitive, event driven environment in preparation to support mission objectives and maintain combat readiness. Pins may enhance human-machine interaction, accelerate machine learning, enhance AI, and give insight to prioritize and operationalize cyberwarfare courses of action.

Countermeasures 730 (see FIG. 7F) address a vulnerability 724 to reduce the probability of an attack or the impact of a threat. Countermeasures 726 do not directly address threats. Instead, countermeasures 726 address the factors that define the threats. Countermeasures 726 range from improving application design or improving code to improving an operational practice. The "depth" of countermeasure 730 characterizes its defendability 726.

FIG. 7G is a 3-D graph 700 illustrating all cells in the cybersecurity matrix. Pins could stop at the layer where the attack was stopped in some embodiments, if at all. While a pin is one vector, attackers still need to get through all "swim lanes" along the z-axis. However, they could zig zag through each layer, so long as the actions on objectives cell is reached and compromised.

Figure 8A:
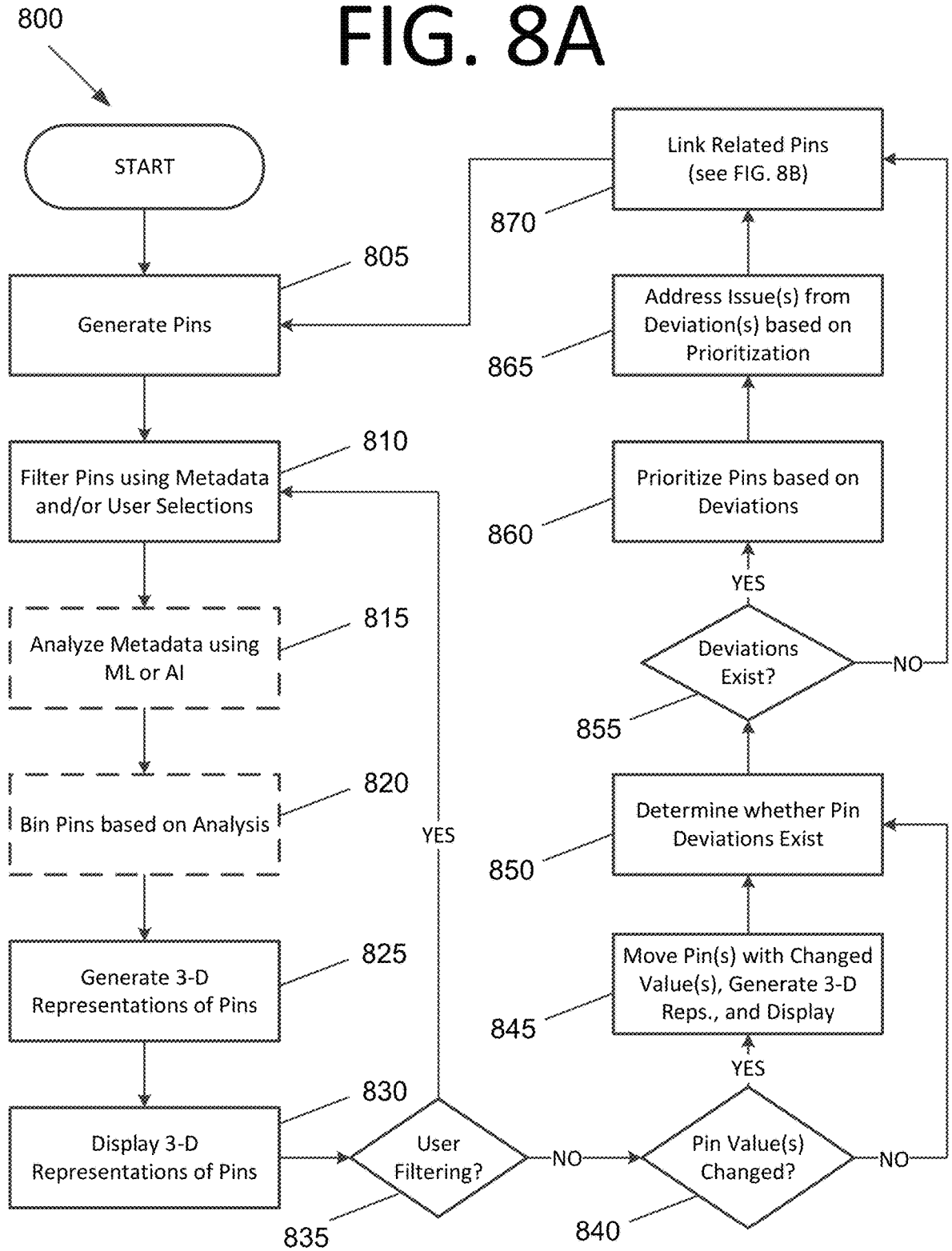
FIG. 8A is a flowchart illustrating a process for providing an interactive interface, according to an embodiment of the present invention.

FIG. 8A is a flowchart illustrating a process 800 for providing an interactive interface, according to an embodiment of the present invention. It should be noted that certain embodiments do not include all of the process steps depicted in FIG. 8A. The process begins with generating pins at 805 (e.g., using data analytics). The pins represent vectors of information and include an operating range and a value, and the generating of the pins may be considered the "data structure phase", where data characteristics are attributed to each pin. In some embodiments, each pin is represented by a respective data structure that includes attribute-value pairs and array data types. In certain embodiments, each pin represents an attack vector, a countermeasure, or both, for a cybersecurity visualization framework. In some embodiments, the operating ranges of the plurality of pins are defined by one or more statistical distributions.

The pins are filtered using metadata at 810. The metadata associated with the plurality pins is analyzed using ML or AI at 815 to find patterns in the vectors of information. For example, deep learning neural networks (DLNNs), shallow learning neural networks (SLNNs), or a combination thereof may be used to identify patterns in the data over time. The confidence intervals returned by these machine learning techniques may then be used to determine the values of the pins within the operating ranges. The pins are then binned into cells of a matrix based on the analysis at 820.

3-D representations of the pins are generated at 825 and the 3-D representations of the pins are displayed on a display at 830. In some embodiments, the generating of the 3-D representations of the pins includes defining the geometry, viewpoint, texture, lighting, and/or shading information for the pins. This can be considered to be the "display phase," where graphical representations of the pins are actually created and displayed to be seen by a user.

In some embodiments, the 3-D representations of the pins include a normal operating range with upper and lower bounds. In certain embodiments, the 3-D representation of each pin is assigned a color based on whether a value associated with the pin is within the normal operating range or outside of the normal operating range as defined by a statistical distribution.

In some embodiments, the pins have a 3-D shape that includes a top, a bottom, and at least one side, and the length of the at least one side is greater than a width of the top and the bottom. In certain embodiments, the top of a pin, the bottom of a pin, or both, include a color, text, or both that visually indicate a value of the pin within the operating range of the pin. In some embodiments, one or more of the pins have a shape corresponding to a type of the respective pin. In certain embodiments, each pin comprises a vulnerability on a first end and either an exploitability or a defendability on a second end.

In some embodiments, the 3-D representations of the pins are displayed within cells of a matrix. In certain embodiments, the matrix represents a cyber kill chain pertaining to stages of cyberattacks, DiD capabilities, or both the cyber kill chain and the DiD capabilities. In some embodiments, the 3-D representation of the pins and the matrix display both attacks and defenses simultaneously. In certain embodiments, each cell of the matrix is assigned a color based on a number of attack vectors, a number of countermeasures, or both, within the respective cell. In some embodiments, two or more of the pins represent an attack path that is exploitable by an attacker.

In some embodiments, users may interact with a software application that generates and displays the pins. Users may change parameters pertaining to pins that should be displayed, desired views, etc. If this occurs at 835, the process returns to step 810, where the pins are filtered based on this information. For instance, in the context of cybersecurity, a user may choose to only see pins pertaining to the weaponization attack surface.

In some embodiments, each pin includes a depth meter, and step 830 may include positioning each 3-D representation of the pins based on its value. When values of one or more pins change at 840, the pins with changed values are moved up or down in accordance with their new respective values at 845. It is determined whether the values of one or more of the pins deviate from the respective operating ranges at 850. When the values of one or more of the pins deviate from the respective operating ranges at 855, the one or more deviating pins are prioritized based on degrees of the deviations of the values thereof from the respective operating ranges at 860. Issues associated with the deviations of the one or more pins are then addressed at 865 using a remedial protocol in the order of the prioritization. Pins may also be linked at 870 if they are related. Process 800 may end when a user closes an application executing the process, for example.

In the case of cybersecurity, deviating pins may be ranked in order of how much they deviate from their normal operating ranges based on the statistical range. This may be determined by percentage, standard deviation, etc. The pin with the highest deviation may then be addressed first by deploying one or more countermeasures that address the vulnerability, then the pin with the second most deviation, the third most, etc. In this manner, some embodiments may employ countermeasures as a remedial protocol to automatically address vulnerabilities in the system.

Per the above, linking or chaining pins to form a path may be beneficial. In the context of cybersecurity, this may result in attack paths or DiD paths. FIG. 8B is a flowchart 870 illustrating a process for linking pins, according to an embodiment of the present invention. Pins are identified that are related at 872. This may involve identifying common criteria between these pins (e.g., they pertain to actions by the same user or group of users, they occur within a certain time period, they originate from or affect the same computing system, they pertain to the same or similar vectors of information, etc.). The identified pins are then linked into a "chained" sequence of pins at 874. Issue(s) associated with the chained sequence may then be automatically addressed at 876 (e.g., using a remedial protocol).

As noted above, in the context of cybersecurity, such identification and chaining of related pins may be useful in the context of vulnerability chaining. Chained vulnerabilities may be visually presented to the user, which then can be identified, prioritized, and addressed. While the impact of some chained pin combinations may be difficult to automatically identify by a computing system, a human user may be able to visualize this chain using some embodiments, understand the potential impact, and prioritize the chain for defensive measures. In certain embodiments, countermeasures may be deployed automatically for the chain.

Figure 9:
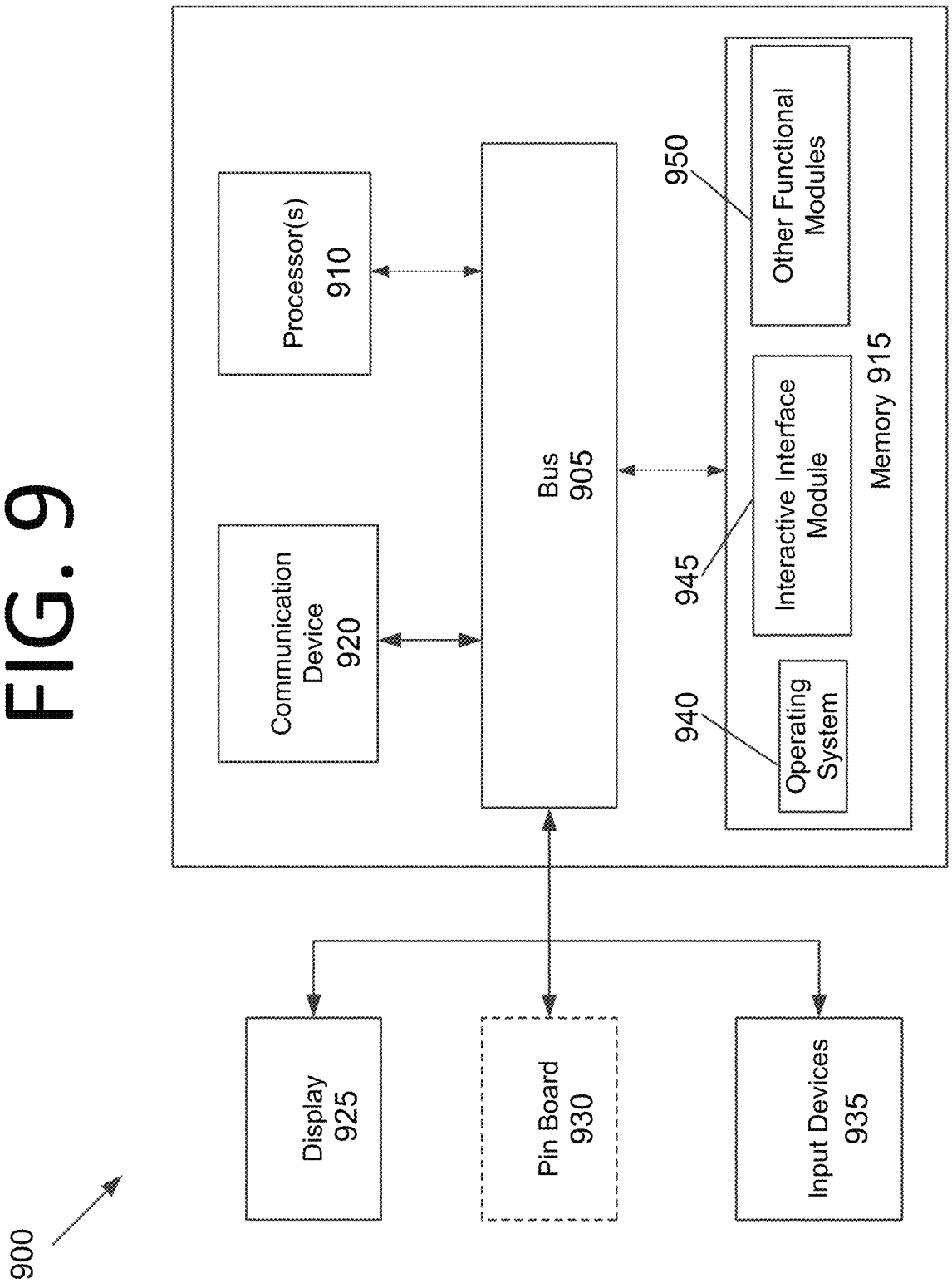
FIG. 9 is an architectural diagram illustrating a computing system configured to provide an interactive interface, according to an embodiment of the present invention.

FIG. 9 is an architectural diagram illustrating a system 900 configured to provide an interactive interface, according to an embodiment of the present invention. System 900 includes a bus 905 or other communication mechanism for communicating information, and processor(s) 910 coupled to bus 905 for processing information. Processor(s) 910 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 910 may also have multiple processing cores, and at least some of the cores may be configured to perform specific functions. Multi-parallel processing may be used in some embodiments. In certain embodiments, at least one of processor(s) 910 may be a neuromorphic circuit that includes processing elements that mimic biological neurons. In some embodiments, neuromorphic circuits may not require the typical components of a Von Neumann computing architecture.

System 900 further includes a memory 915 for storing information and instructions to be executed by processor(s) 910. Memory 915 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 910 and may include volatile media, non-volatile media, or both. The media may also be removable, non-removable, or both.

Additionally, system 900 includes a communication device 920, such as a transceiver, to provide access to a communications network via a wireless and/or wired connection. In some embodiments, communication device 920 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideB and (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 920 may include one or more antennas that are singular, arrayed, phased, switched, beamforming, beam-steering, a combination thereof, and or any other antenna configuration without deviating from the scope of the invention.

Processor(s) 910 are further coupled via bus 905 to a display 925, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 925 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

In some embodiments, display 925 shows pins, where the quantity, size, and color combination of the pins may vary. Each pin may have a unique logical address, a size of eight bits or more, the ability to project multiple (and potentially millions or more) of different colors. Pins can serve as virtual 3-D representations of insight based on data.

An optional pin board 930 may provide a physical representation of pins that move via actuators or some other mechanism. Pins change colors via LEDs, may have different information displayed thereon, etc. The combination of movement, colors, and text information may allow pins to be an effective vehicle for conveying information to a user.

Input devices 935, such as a computer mouse, a touchpad, a keyboard, etc., are further coupled to bus 905 to enable a user to interface with system 900. However, in certain embodiments, a physical keyboard and mouse may not be present, and the user may interact with the device solely through display 925, for example. Any type and combination of input devices may be used as a matter of design choice. In certain embodiments, no physical input device and/or display is present. For instance, the user may interact with system 900 remotely via another computing system in communication therewith, or system 900 may operate autonomously.

Memory 915 stores software modules that provide functionality when executed by processor(s) 910. The modules include an operating system 940 for system 900. The modules further include an interactive interface module 945 that is configured to perform all or part of the functionality of the processes and/or modules described herein or derivatives thereof. System 900 may include one or more additional functional modules 950 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 8A and 8B may be performed by a computer program, encoding instructions for the processor(s) to perform at least part of the process(es) described in FIGS. 8A and 8B, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 910 of system 900 of FIG. 9) to implement all or part of the process steps described in FIGS. 8A and 8B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
generating a plurality of pins, by a computing system, the plurality of pins representing vectors of information and each comprising a respective operating range and a value;
generating three-dimensional (3-D) representations of the plurality of pins, by the computing system;
displaying the 3-D representations of the plurality of pins on a display, by the computing system; and
responsive to a change of a value of at least one respective pin the plurality of pins:
generating a modified representation of the at least one respective pin of the plurality of pins, by the computing system, and
displaying the 3-D representations of the plurality of pins on the display, by the computing system, wherein
the 3-D representations comprise the modified representation of the at least one respective pin that comprises the respective changed value.

2. The computer-implemented method of claim 1, wherein each pin represents an attack vector, a countermeasure, or both, for a cybersecurity visualization framework.

3. The computer-implemented method of claim 1, further comprising:
filtering the plurality of pins using metadata, user-defined parameters, or both, by the computing system; and
displaying 3-D representations of a subset of the plurality of pins based on the filtering, by the computing system.

4. The computer-implemented method of claim 1, wherein the operating ranges of the plurality of pins are defined by one or more statistical distributions.

5. The computer-implemented method of claim 1, wherein the 3-D representations of the plurality of pins comprise a normal operating range with upper and lower bounds.

6. The computer-implemented method of claim 5, wherein the 3-D representation of each pin is assigned a color based on whether a value associated with the pin is within the normal operating range or outside of the normal operating range as defined by a statistical distribution.

7. The computer-implemented method of claim 1, wherein
the 3-D representations of the plurality of pins have a 3-D shape comprising a top, a bottom, and at least one side, and
a length of the at least one side is greater than a width of the top and the bottom.

8. The computer-implemented method of claim 7, wherein the top, the bottom, or both, comprise a color, text, or both that visually indicate a value of the pin within the operating range of the pin.

9. The computer-implemented method of claim 7, wherein one or more pins of the plurality of pins have a shape corresponding to a type of the respective pin.

10. The computer-implemented method of claim 1, wherein the 3-D representations of the plurality of pins are displayed within cells of a matrix.

11. The computer-implemented method of claim 10, wherein the matrix represents a cyber kill chain pertaining to stages of cyberattacks, defense in depth (DiD) capabilities, or both the cyber kill chain and the DiD capabilities.

12. The computer-implemented method of claim 11, wherein the 3-D representation of the plurality of pins and the matrix display both attacks and defenses simultaneously.

13. The computer-implemented method of claim 11, wherein each cell of the matrix is assigned a color based on a number of attack vectors, a number of countermeasures, or both, within the respective cell.

14. The computer-implemented method of claim 1, further comprising:
analyzing metadata associated with the plurality pins using machine learning (ML) or artificial intelligence (AI), by the computing system, to find patterns in the vectors of information; and
binning the plurality of pins into cells of a matrix based on the analysis, by the computing system.

15. The computer-implemented method of claim 1, wherein two or more of the plurality of pins represent an attack path that is exploitable by an attacker.

16. The computer-implemented method of claim 1, wherein each pin of the plurality of pins comprises a depth meter and the method further comprises:
positioning each 3-D representation of the plurality of pins based on the respective value, by the computing system; and
moving a respective pin up or down according to a new value after the value of the pin changes, by the computing system.

17. The computer-implemented method of claim 1, wherein each pin of the plurality of pins is represented by a respective data structure comprising attribute-value pairs and array data types.

18. The computer-implemented method of claim 1, wherein each pin comprises a vulnerability on a first end and either an exploitability or a defendability on a second end.

19. The computer-implemented method of claim 1, further comprising:
determining, by the computing system, whether the values of one or more of the plurality of pins deviate from the respective operating ranges; and
when the values of one or more of the plurality of pins deviate from respective operating ranges, prioritizing the one or more deviating pins based on degrees of the deviations of the values of the one or more pins from the respective operating ranges, by the computing system.

20. The computer-implemented method of claim 19, further comprising:
addressing issues associated with the deviating one or more pins using a remedial protocol, by the computing system, in an order of the prioritization.

21. The computer-implemented method of claim 1, further comprising:

identifying related pins of the plurality of pins, by the computing system;
linking the identified related pins into a chained sequence, by the computing system; and
addressing issues associated with the chained sequence of pins using a remedial protocol, by the computing system.

22. A computer program embodied on a non-transitory computer-readable medium, the program configured to cause at least one processor to:
generate a plurality of pins representing vectors of information and each comprising a respective operating range and a value, the operating range defined by a statistical distribution;
generate three-dimensional (3-D) representations of the plurality of pins within cells of a matrix;
display the 3-D representations of the plurality of pins within the cells of the matrix on a display, by the computing system; and
responsive to a change of a value of at least one respective pin the plurality of pins:
generate a modified representation of the at least one respective pin of the plurality of pins, and
display the 3-D representations of the plurality of pins within the cells of the matrix on the display, wherein
the 3-D representations comprise the modified representation of the at least one respective pin that comprises the respective changed value.

23. The computer program of claim 22, wherein each pin represents an attack vector, a countermeasure, or both, for a cybersecurity visualization framework.

24. The computer program of claim 22, wherein
the 3-D representations of the plurality of pins comprise a normal operating range with upper and lower bounds, and
the 3-D representation of each pin is assigned a color based on whether a value associated with the pin is within the normal operating range or outside of the normal operating range as defined by the statistical distribution.

25. The computer program of claim 22, wherein
the plurality of pins have a 3-D shape comprising a top, a bottom, and at least one side,
a length of the at least one side is greater than a width of the top and the bottom,
the top of a pin, the bottom of a pin, or both, comprise a color, text, or both that visually indicate a value of the pin within the operating range of the pin, and
one or more pins of the plurality of pins have a shape corresponding to a type of the respective pin.

26. The computer program of claim 22, wherein the matrix represents a cyber kill chain pertaining to stages of cyberattacks, defense in depth (DiD) capabilities, or both the cyber kill chain and the DiD capabilities.

27. The computer program of claim 22, wherein the program is further configured to cause the at least one processor to:
analyze metadata associated with the plurality pins using machine learning (ML) or artificial intelligence (AI) to find patterns in the vectors of information; and
bin the plurality of pins into the cells of the matrix based on the analysis.

28. The computer program of claim 22, wherein each pin of the plurality of pins comprises a depth meter and the program is further configured to cause the at least one processor to:
position each 3-D representation of the plurality of pins based on the respective value; and
move a respective pin up or down according to a new value after the value of the pin changes.

29. The computer program of claim 22, wherein each pin of the plurality of pins is represented by a respective data structure comprising attribute-value pairs and array data types.

30. The computer program of claim 22, wherein the program is further configured to cause the at least one processor to:
determine whether the values of one or more of the plurality of pins deviate from the respective operating ranges;
when the values of one or more of the plurality of pins deviate from respective operating ranges, prioritize the one or more deviating pins based on degrees of the deviations of the values of the one or more pins from the respective operating ranges; and
address issues associated with the deviating one or more pins using a remedial protocol in an order of the prioritization.

31. The computer program of claim 22, wherein the program is further configured to cause the at least one processor to:
identify related pins of the plurality of pins;
link the identified related pins into a chained sequence; and
address issues associated with the chained sequence of pins using a remedial protocol.

32. A computing system, comprising:
memory storing computer program instructions; and
at least one processor configured to execute the computer program instructions, the instructions configured to cause the at least one processor to:
generate a plurality of pins representing vectors of information and each comprising a respective operating range and a value, the operating range defined by one or more statistical distributions; and
generate three-dimensional (3-D) representations of the plurality of pins within cells of a matrix,
display the 3-D representations of the plurality of pins within the cells of the matrix on a display, by the computing system, and
responsive to a change of a value of at least one respective pin the plurality of pins:
generate a modified representation of the at least one respective pin of the plurality of pins, and
display the 3-D representations of the plurality of pins within the cells of the matrix on the display, wherein
each pin represents an attack vector, a countermeasure, or both, for a cybersecurity visualization framework,
the 3-D representation of the plurality of pins and the matrix display both attacks and defenses simultaneously, and
the 3-D representations comprise the modified representation of the at least one respective pin that comprises the respective changed value.

33. The computing system of claim 32, wherein the instructions are further configured to cause the at least one processor to:
filter the plurality of pins using metadata, user-defined parameters, or both; and
display 3-D representations of a subset of the plurality of pins based on the filtering.

34. The computing system of claim 32, wherein
the 3-D representations of the plurality of pins comprise a normal operating range with upper and lower bounds, and
the 3-D representation of each pin is assigned a color based on whether a value associated with the pin is within the normal operating range or outside of the normal operating range as defined by a statistical distribution.

35. The computing system of claim 32, wherein
a top of a 3-D representation of a pin, a bottom of the 3-D representation of the pin, or both, comprise a color, text, or both that visually indicate a value of the pin within the operating range of the pin, and
one or more pins of the plurality of pins have a shape corresponding to a type of the respective pin.

36. The computing system of claim 32, wherein the instructions are further configured to cause the at least one processor to:
analyze metadata associated with the plurality pins using machine learning (ML) or artificial intelligence (AI) to find patterns in the vectors of information; and
bin the plurality of pins into cells of a matrix based on the analysis.

37. The computing system of claim 32, wherein the instructions are further configured to cause the at least one processor to:
position each 3-D representation of the plurality of pins based on the respective value; and
move a respective pin up or down according to a new value after the value of the pin changes.

38. The computing system of claim 32, wherein each pin of the plurality of pins is represented by a respective data structure comprising attribute-value pairs and array data types.

39. The computing system of claim 32, wherein each pin comprises a vulnerability on a first end and either an exploitability or a defendability on a second end.

40. The computing system of claim 32, wherein the instructions are further configured to cause the at least one processor to:
determine whether the values of one or more of the plurality of pins deviate from the respective operating ranges;
when the values of one or more of the plurality of pins deviate from respective operating ranges, prioritize the one or more deviating pins based on degrees of the deviations of the values of the one or more pins from the respective operating ranges; and
address issues associated with the deviating one or more pins using a remedial protocol in an order of the prioritization.

41. The computing system of claim 32, wherein the instructions are further configured to cause the at least one processor to:
identify related pins of the plurality of pins;
link the identified related pins into a chained sequence; and
address issues associated with the chained sequence of pins using a remedial protocol.

* * * * *